(12) United States Patent
Yoshida

(10) Patent No.: US 10,390,076 B2
(45) Date of Patent: Aug. 20, 2019

(54) IMAGE RECEIVING/REPRODUCING DEVICE, IMAGE GENERATING/TRANSMITTING DEVICE, DISPLAY SYSTEM, IMAGE RECEIVING/REPRODUCING METHOD, IMAGE GENERATING/TRANSMITTING METHOD, AND COMPUTER READABLE MEDIUM

(71) Applicant: MITSUBISHI ELECTRIC CORPORATION, Tokyo (JP)

(72) Inventor: Hiroshi Yoshida, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/071,972

(22) PCT Filed: Mar. 29, 2016

(86) PCT No.: PCT/JP2016/060202
§ 371 (c)(1),
(2) Date: Jul. 23, 2018

(87) PCT Pub. No.: WO2017/168582
PCT Pub. Date: Oct. 5, 2017

(65) Prior Publication Data
US 2019/0037266 A1 Jan. 31, 2019

(51) Int. Cl.
*H04N 21/431* (2011.01)
*H04L 29/06* (2006.01)
(Continued)

(52) U.S. Cl.
CPC ......... *H04N 21/431* (2013.01); *G06F 3/1446* (2013.01); *H04L 65/4076* (2013.01);
(Continued)

(58) Field of Classification Search
None
See application file for complete search history.

(56) References Cited

U.S. PATENT DOCUMENTS 6,259,736 B1 7/2001 Chujoh et al.
6,549,236 B2 * 4/2003 Oeda .................... H04N 1/0044
348/333.05
(Continued)

FOREIGN PATENT DOCUMENTS

JP    6-105303 A    4/1994
JP   11-41609 A    2/1999
(Continued)

OTHER PUBLICATIONS

International Search Report (Form PCT/ISA/210), dated Jul. 19, 2016, for International Application No. PCT/JP2016/062370, with an English translation.

(Continued)

*Primary Examiner* — Alexander Q Huerta
(74) *Attorney, Agent, or Firm* — Birch, Stewart, Kolasch & Birch, LLP

(57) ABSTRACT

An image generating/transmitting device divides an image which is to be displayed on a display screen formed of a plurality of monitor devices into a plurality of divided images, generates divided image definition information that defines a display region of each divided image on the display screen by using screen coordinates which are set on the display screen, and transmits the divided image definition information to an image receiving/reproducing device. The image receiving/reproducing device identifies, by using the screen coordinates, a connected monitor region on the display screen occupied by a connected monitor device which is the monitor device to which the image receiving/reproducing device is connected, receives the divided image definition information, extracts a receiving target divided (Continued)

image whose display region defined by the divided image definition information overlaps at least partially with the connected monitor region, extracts a reproduction target range overlapping with the connected monitor region in the receiving target divided image, receives the receiving target divided image, reproduces the reproduction target range in the receiving target divided image, and outputs the reproduction result of the reproduction target range to the connected monitor device.

9 Claims, 17 Drawing Sheets

(51) Int. Cl.
*G06F 3/14* (2006.01)
*G09G 5/391* (2006.01)

(52) U.S. Cl.
CPC .......... *H04L 65/605* (2013.01); *H04L 65/607* (2013.01); *G06F 3/1423* (2013.01); *G09G 5/391* (2013.01); *G09G 2300/026* (2013.01); *G09G 2340/0407* (2013.01); *G09G 2356/00* (2013.01); *G09G 2360/04* (2013.01); *G09G 2370/04* (2013.01); *G09G 2370/042* (2013.01)

(56) References Cited

U.S. PATENT DOCUMENTS

| | | | | |
|---|---|---|---|---|
| 7,573,462 | B2* | 8/2009 | Ouchi | G06F 3/03545 178/18.01 |
| 8,482,480 | B2* | 7/2013 | Kim | G06F 3/1446 345/1.1 |
| 9,519,373 | B2* | 12/2016 | Nakamura | G09G 5/14 |
| 2002/0154703 | A1 | 10/2002 | Kubota et al. | |
| 2004/0027482 | A1* | 2/2004 | Lee | H04N 9/12 348/383 |
| 2009/0015513 | A1* | 1/2009 | Kim | G06F 3/1446 345/1.3 |
| 2009/0147130 | A1* | 6/2009 | Kim | G09G 5/003 348/383 |
| 2010/0080478 | A1 | 4/2010 | Satou et al. | |
| 2010/0097379 | A1* | 4/2010 | Choi | G09G 5/363 345/428 |
| 2010/0111491 | A1* | 5/2010 | Kamoto | G06F 3/1446 386/207 |
| 2010/0134384 | A1* | 6/2010 | Kim | G06F 3/1431 345/1.3 |
| 2010/0303153 | A1 | 12/2010 | Kadono | |
| 2011/0109526 | A1* | 5/2011 | Bauza | G06F 3/1446 345/1.3 |
| 2011/0229106 | A1* | 9/2011 | Cho | H04N 5/775 386/219 |
| 2012/0275518 | A1 | 11/2012 | Kadono et al. | |
| 2012/0308151 | A1 | 12/2012 | Tatsuka et al. | |
| 2014/0079120 | A1 | 3/2014 | Hiraoka et al. | |
| 2016/0057508 | A1* | 2/2016 | Borcherdt | H04N 21/2353 715/719 |
| 2017/0255304 | A1* | 9/2017 | Lee | H04N 5/4403 |
| 2018/0268782 | A1* | 9/2018 | Kaneko | H04L 61/2038 |
| 2018/0359515 | A1* | 12/2018 | Lee | H04N 5/4403 |

FOREIGN PATENT DOCUMENTS

| | | |
|---|---|---|
| JP | 11-220733 A | 8/1999 |
| JP | 2001-359102 A | 12/2001 |
| JP | 2003-209828 A | 7/2003 |
| JP | 2005-301131 A | 10/2005 |
| JP | 2007-300455 A | 11/2007 |
| JP | 2008-244993 A | 10/2008 |
| JP | 2009-212821 A | 9/2009 |
| JP | 2010-103985 A | 5/2010 |
| JP | 2010-136220 A | 6/2010 |
| JP | 2010-206753 A | 9/2010 |
| JP | 2010-233263 A | 10/2010 |
| JP | 2011-166512 A | 8/2011 |
| JP | 2011-233991 A | 11/2011 |
| JP | 2012-23765 A | 2/2012 |
| JP | 2012-169739 A | 9/2012 |
| JP | 2013-106132 A | 5/2013 |
| JP | 2014-60666 A | 4/2014 |
| JP | 2015-170078 A | 9/2015 |
| WO | WO 01/056244 A1 | 8/2001 |
| WO | WO 2009/069316 A1 | 6/2009 |
| WO | WO 2011/004598 A1 | 1/2011 |

OTHER PUBLICATIONS

International Search Report (PCT/ISA/210) issued in PCT/JP2016/060202, dated Jun. 21, 2016.

* cited by examiner

CONNECTION INFORMATION

| SCREEN ID | MONITOR POSITION | | MONITOR SIZE (RESOLUTION) | | RECEIVING DEVICE ID | NUMBER OF SCREENS | IP ADDRESS |
|---|---|---|---|---|---|---|---|
| | HORIZONTAL | VERTICAL | HORIZONTAL | VERTICAL | | | |
| 001 | 0 | 0 | 2000 | 1000 | 11a | 1 | 192.168.0.1 |
| 002 | 2000 | 0 | 2000 | 1000 | 11b | 1 | 192.168.0.2 |
| 003 | 4000 | 0 | 2000 | 1000 | 11c | 1 | 192.168.0.3 |
| 004 | 6000 | 0 | 2000 | 1000 | 11d | 1 | 192.168.0.4 |
| 005 | 0 | 1000 | 2000 | 1000 | 11e | 1 | 192.168.0.5 |
| 006 | 2000 | 1000 | 2000 | 1000 | 11f | 1 | 192.168.0.6 |
| 007 | 4000 | 1000 | 2000 | 1000 | 11g | 1 | 192.168.0.7 |
| 008 | 6000 | 1000 | 2000 | 1000 | 11h | 1 | 192.168.0.8 |

Fig. 12

| SCREEN ID | RESOLUTION FOR DISPLAY | | RELATIVE POSITION WITH RESPECT TO THE MULTI-LARGE SCREEN | | TITLE | DEPTH |
|---|---|---|---|---|---|---|
| | HORIZONTAL | VERTICAL | HORIZONTAL | VERTICAL | | |
| 001 | 6000 | 1500 | 1000 | 200 | ABC | 0 |
| 002 | 1900 | 900 | 5800 | 1000 | XYZ | 1 |

DISPLAY IMAGE LAYOUT INFORMATION (CASE OF UNMAGNIFIED DISPLAY)

IMAGE DIVISION/DISTRIBUTION TABLE

| ATTRIBUTE INFORMATION | |
|---|---|
| IMAGE ID | 001 |
| NUMBER OF DIVISIONS | 4 |
| RESOLUTION (HORIZONTAL) | 6000 |
| RESOLUTION (VERTICAL) | 1500 |

| DIVIDED STREAM INFORMATION | | | | | | | |
|---|---|---|---|---|---|---|---|
| DIVISION ID | RELATIVE POSITION WITH RESPECT TO THE MULTI-LARGE SCREEN | | RECTANGULAR SIZE | | MULTICAST ADDRESS | PORT NUMBER | TRANSFER RATE |
| | HORIZONTAL | VERTICAL | HORIZONTAL | VERTICAL | | | |
| A | 1000 | 200 | 3000 | 750 | 239.1.1.1 | 50002 | 6Mbps |
| B | 4000 | 200 | 3000 | 750 | 239.1.1.2 | 50004 | 6Mbps |
| C | 1000 | 950 | 3000 | 750 | 239.1.1.3 | 50006 | 6Mbps |
| D | 4000 | 950 | 3000 | 750 | 239.1.1.4 | 50008 | 6Mbps |

(b)

| ATTRIBUTE INFORMATION | |
|---|---|
| IMAGE ID | 002 |
| NUMBER OF DIVISIONS | 1 |
| RESOLUTION (HORIZONTAL) | 1900 |
| RESOLUTION (VERTICAL) | 900 |

| DIVIDED STREAM INFORMATION | | | | | | | |
|---|---|---|---|---|---|---|---|
| DIVISION ID | RELATIVE POSITION WITH RESPECT TO THE MULTI-LARGE SCREEN | | RECTANGULAR SIZE | | MULTICAST ADDRESS | PORT NUMBER | TRANSFER RATE |
| | HORIZONTAL | VERTICAL | HORIZONTAL | VERTICAL | | | |
| A | 5800 | 1000 | 1900 | 900 | 239.1.1.5 | 50010 | 4Mbps |

Fig. 14

DISPLAY LIST EXAMPLE
(IN CASE OF IMAGE RECEIVING/REPRODUCING DEVICE 11h
CONNECTED TO MONITOR DEVICE WITH SCREEN ID: 008)

| IMAGE ID | DIVISION ID | STARTING POINT OF REPRODUCTION TARGET RANGE (UPPER-LEFT COORDINATES) | | RESOLUTION OF REPRODUCTION TARGET RANGE | | POSITION ON MONITOR IN WHICH REPRODUCTION TARGET RANGE IS DISPLAYED | | SCALING FACTOR | DEPTH |
|---|---|---|---|---|---|---|---|---|---|
| | | HORIZONTAL | VERTICAL | HORIZONTAL | VERTICAL | HORIZONTAL | VERTICAL | | |
| 001 | D | 2000 | 0 | 1000 | 750 | 0 | 0 | 1.00 | 0 |
| 002 | A | 200 | 0 | 1700 | 900 | 0 | 0 | 1.00 | 1 |

Fig. 16

| SCREEN ID | MONITOR POSITION | | MONITOR SIZE (RESOLUTION) | | RECEIVING DEVICE ID | NUMBER OF SCREENS | IP ADDRESS |
|---|---|---|---|---|---|---|---|
| | HORIZONTAL | VERTICAL | HORIZONTAL | VERTICAL | | | |
| 001 | 0 | 0 | 2000 | 1000 | 11a | 2 | 192.168.0.1 |
| 002 | 2000 | 0 | 2000 | 1000 | | | |
| 003 | 4000 | 0 | 2000 | 1000 | 11c | 1 | 192.168.0.3 |
| 005 | 0 | 1000 | 2000 | 1000 | 11e | 2 | 192.168.0.5 |
| 006 | 2000 | 1000 | 2000 | 1000 | | | |
| 007 | 4000 | 1000 | 2000 | 1000 | 11g | 1 | 192.168.0.7 |
| 004 | 6000 | 0 | 2000 | 1000 | 11d | 2 | 192.168.0.4 |
| 008 | 6000 | 1000 | 2000 | 1000 | | | |

CONNECTION INFORMATION

IMAGE RECEIVING/REPRODUCING DEVICE, IMAGE GENERATING/TRANSMITTING DEVICE, DISPLAY SYSTEM, IMAGE RECEIVING/REPRODUCING METHOD, IMAGE GENERATING/TRANSMITTING METHOD, AND COMPUTER READABLE MEDIUM

TECHNICAL FIELD

The present invention relates to a display system that makes a display screen formed of a plurality of arranged monitor devices (hereinafter also referred to as a multi-large screen) display an image.

BACKGROUND ART

In Patent Literature 1, a distributing device divides video whose resolution is higher than that of a receiving device into a plurality of blocks. Moreover, the distributing device transmits to the receiving device, video division information formed of the resolution of the video, position information of blocks, multicast addresses and ports assigned to the blocks, and so forth. Furthermore, the distributing device encodes the video by designating resolution on a block-by-block basis so as to correspond to enlarged display, reduced display, or unmagnified display which is assumed in advance, and transmits the encoded video to the receiving device as a stream. The receiving device can perform enlarged display, reduced display, or unmagnified display of the video by receiving and displaying the stream of the designated resolution. As described above, according to Patent Literature 1, in the receiving device, only by changing a stream (a set of multicast and a port) which the receiving device receives, it is possible to perform enlarged display, reduced display, or unmagnified display of video.

Moreover, in Patent Literature 2, a server device manages monitor information of a plurality of monitor devices which configure a multi-large screen. Then, in accordance with a display mode on the multi-large screen, the server device generates, for each display device which connects to the monitor device, an image which the display device has to output to the monitor device. The server device then transmits a corresponding image to each display device.

CITATION LIST

Patent Literature

Patent Literature 1: JP 2009-212821
Patent Literature 2: JP 2005-301131

SUMMARY OF INVENTION

Technical Problem

In the technique described in Patent Literature 1, a single receiving device merely receives a designated stream and displays video. In a multi-large-screen system, a plurality of receiving devices connected to a plurality of monitor devices, which configure a multi-large screen, receive a plurality of images forming a huge image which is displayed on the multi-large screen and the plurality of monitor devices display their respective allotted images of the plurality of images. In such a multi-large-screen system, it is necessary to identify placement information of the monitor devices in the multi-large screen, the relative positions of the monitor devices, a display region of each image in the multi-large screen, and so forth. Since such information is not managed in Patent Literature 1, the technique described in Patent Literature 1 cannot be applied to the multi-large-screen system.

In the technique described in Patent Literature 2, each receiving device receives all the images forming a huge image, reproduces all the images, and makes a monitor device, to which the receiving device is connected, display a portion of the images. For instance, assume that a huge image which is displayed on a multi-large screen is divided into ten divided images. With the technique of Patent Literature 2, to make a monitor device display one divided image, each receiving device has to receive all of the ten divided images and reproduce all of the ten divided images. As described above, the technique of Patent Literature 2 has a problem of high reception load and reproduction load.

A main object of the present invention is to solve such problems and a main object thereof is to reduce a reception load and a reproduction load in a system that makes a display screen formed of a plurality of arranged monitor devices display an image.

Solution to Problem

An image receiving/reproducing device according to the present invention that is included in a display system which makes a display screen formed of a plurality of arranged monitor devices display an image, and that is connected to a monitor device among the plurality of monitor devices, the image receiving/reproducing device includes:

a connected monitor region identifying section to identify a connected monitor region which is a region on the display screen occupied by a connected monitor device which is the monitor device to which the image receiving/reproducing device is connected, by using screen coordinates which are coordinates set on the display screen;

a receiving section to receive divided image definition information that defines a display region of each of a plurality of divided images on the display screen by using the screen coordinates, the plurality of divided images obtained by division of the image which is to be displayed on the display screen;

an extracting section to extract from the plurality of divided images, a receiving target divided image which is a divided image whose display region defined by the divided image definition information overlaps at least partially with the connected monitor region and extract a reproduction target range which is a range overlapping with the connected monitor region in the receiving target divided image; and a reproducing section to receive the receiving target divided image, reproduce the reproduction target range in the receiving target divided image, and output a reproduction result of the reproduction target range to the connected monitor device.

Advantageous Effects of Invention

In the present invention, since an image receiving/reproducing device receives only a receiving target divided image among a plurality of divided images and reproduces only a reproduction target range in the receiving target divided image, it is possible to reduce a reception load and a reproduction load.

BRIEF DESCRIPTION OF DRAWINGS

FIG. 12 is a diagram illustrating an example of display image layout information according to Embodiment 1.

FIG. 13 is a diagram illustrating an example of an image division/distribution table according to Embodiment 1.

FIG. 14 is a diagram illustrating an example of a display list according to Embodiment 1.

FIG. 16 is a diagram illustrating an example of connection information according to Embodiment 3.

DESCRIPTION OF EMBODIMENTS

Embodiment 1

In the present embodiment, a multi-large-screen system that displays an image whose resolution is 16K dots, 32K dots, or higher on a display screen formed of a plurality of arranged monitor devices will be described.

*Description of a Configuration*

Figure 1:
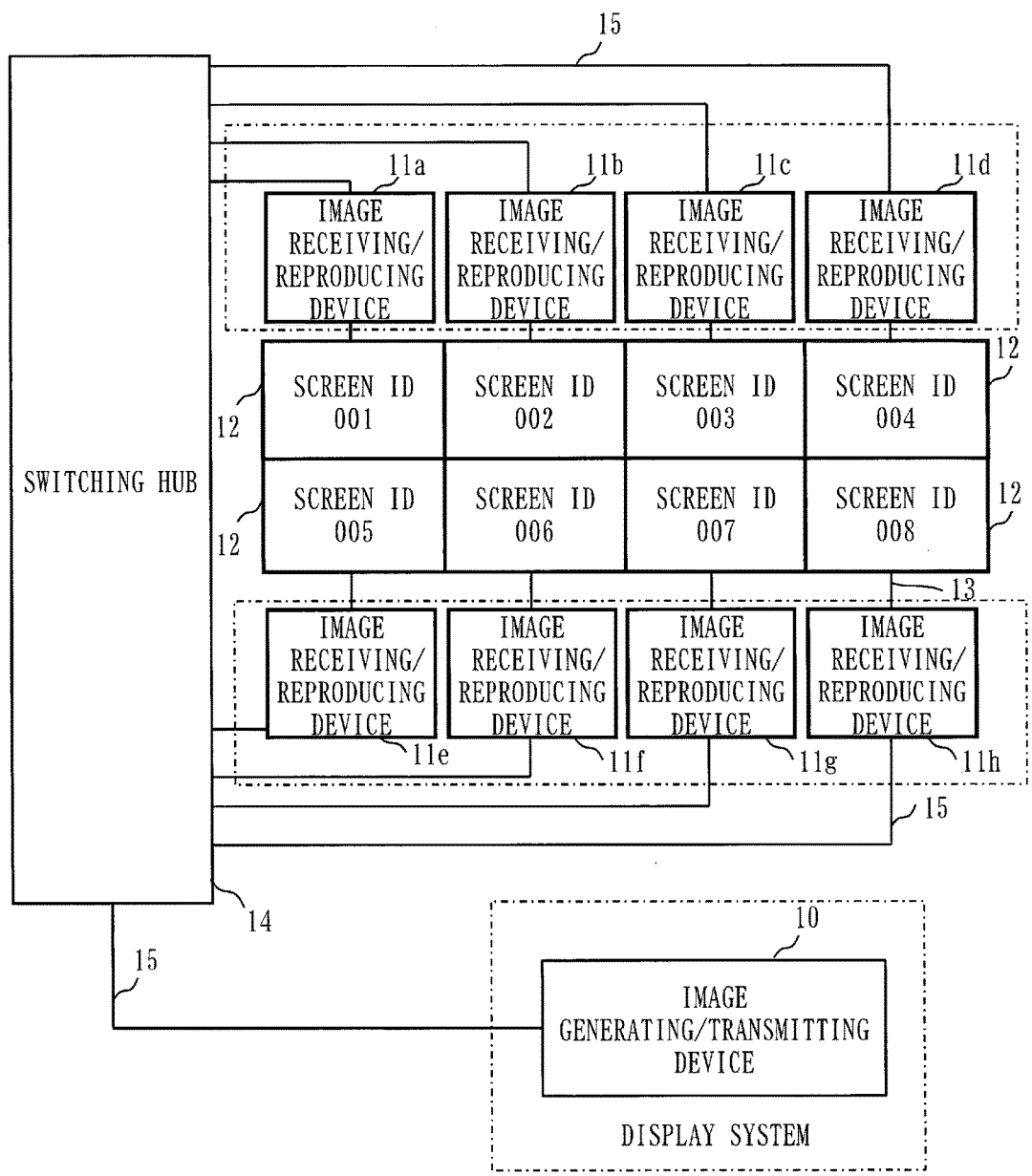
FIG. 1 is a diagram illustrating a configuration example of a multi-large-screen system according to Embodiment 1.

FIG. 1 illustrates a configuration example of the multi-large-screen system according to the present embodiment.

The multi-large-screen system according to the present embodiment is configured with an image generating/transmitting device 10, image receiving/reproducing devices 11a to 11h, a plurality of monitor devices 12, and a switching hub 14.

It is to be noted that, if there is no need to distinguish the image receiving/reproducing devices 11a to 11h from each other, the image receiving/reproducing devices 11a to 11h are collectively referred to as an image receiving/reproducing device 11. The image receiving/reproducing device 11 may be a portable notebook PC (Personal Computer) or tablet terminal.

Moreover, a range surrounded with alternate long and short dashed lines, that is, a combination of the image generating/transmitting device 10 and the image receiving/reproducing device 11 corresponds to a display system.

Furthermore, an operation which is performed by the image generating/transmitting device 10 corresponds to an image generating and transmitting method and an image generating and transmitting program. Moreover, an operation which is performed by the image receiving/reproducing device 11 corresponds to an image receiving/reproducing method and an image receiving/reproducing program.

In the present embodiment, the plurality of monitor devices 12 are arranged to form one display screen (a multi-large screen). In FIG. 1, eight monitor devices 12 are arranged in the form of a lattice to form a multi-large screen. A screen ID (Identifier) is set for each monitor device 12.

The image generating/transmitting device 10 generates an image which is displayed on the multi-large screen. The image generating/transmitting device 10 generates an image which is to be displayed on the multi-large screen by capturing, for example, an image generated by an application program, a desktop image, an input image, and so forth at fixed intervals. Moreover, the image generating/transmitting device 10 divides the image which is to be displayed on the multi-large screen into a plurality of multicast streams and transmits the multicast streams to the switching hub 14.

The image generating/transmitting device 10 and the switching hub 14 are connected by a network cable 15.

Each image receiving/reproducing device 11 is connected to the monitor device 12 by a video cable 13. It is to be noted that the monitor device 12 which is connected to the image receiving/reproducing device 11 is referred to as a connected monitor device. The connected monitor device of the image receiving/reproducing device 11a is the monitor device 12 with a screen ID: 001. Moreover, the connected monitor device of the image receiving/reproducing device 11h is the monitor device 12 with a screen ID: 008.

The image receiving/reproducing device 11 is connected to the switching hub 14 via the network cable 15.

The image receiving/reproducing device 11 receives, from the switching hub 14, a divided image which the image receiving/reproducing device 11 makes the connected monitor device display. In the present embodiment, based on a connected monitor region which is a region occupied by the connected monitor device on the multi-large screen, the image receiving/reproducing device 11 extracts a divided image to be received (hereinafter referred to as a receiving target divided image) from among a plurality of divided images and further extracts a range to be reproduced (hereinafter referred to as a reproduction target range) from the receiving target divided image. Then, the image receiving/reproducing device 11 receives only the receiving target divided image among the plurality of divided images and reproduces only the reproduction target range in the receiving target divided image. The image receiving/reproducing device 11 then outputs the reproduction result of the reproduction target range to the connected monitor device.

In FIG. 1, the image receiving/reproducing device 11 and the monitor device 12 are illustrated as different pieces of hardware; however, the image receiving/reproducing device 11 may incorporate the monitor device 12. When the image receiving/reproducing device 11 incorporates the monitor device 12, the video cable 13 can be omitted.

The switching hub 14 performs data communication with the image generating/transmitting device 10 and performs data communication with the plurality of image receiving/reproducing devices 11. In the present embodiment, the switching hub 14 has a function called multicast control. The multicast control allows the image receiving/reproducing device 11 to selectively receive only the receiving target divided image.

It is to be noted that the switching hub 14 corresponds to a relay device.

Figure 17:
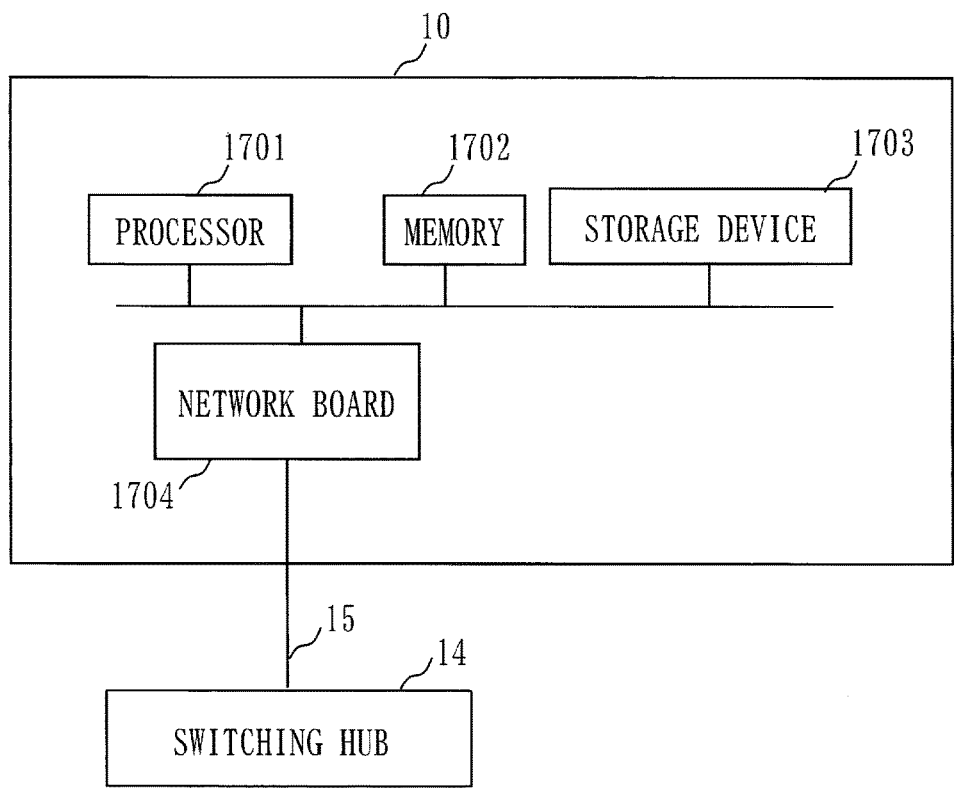
FIG. 17 is a diagram illustrating a hardware configuration example of the image generating/transmitting device according to Embodiment 1.

Next, a hardware configuration example of the image generating/transmitting device 10 is illustrated in FIG. 17.

The image generating/transmitting device 10 is a computer having hardware: a processor 1701, a memory 1702, a storage device 1703, and a network board 1704.

The processor 1701 is, for example, a CPU (Central Processing Unit). The processor 1701 executes a program. More specifically, the processor 1701 executes a program that implements functional component elements illustrated in FIG. 2. The details of the functional component elements illustrated in FIG. 2 will be described later.

The memory 1702 is a volatile storage device and, specifically, RAM (Random Access Memory).

The storage device 1703 is a nonvolatile storage device and, specifically, an HDD (Hard Disk Drive) or flash memory.

The program which the processor 1701 executes is stored in the storage device 1703, and is loaded into the memory 1702 and executed by the processor 1701.

The network board 1704 is a circuit for performing transmission and reception of data with the switching hub 14.

Figure 18:
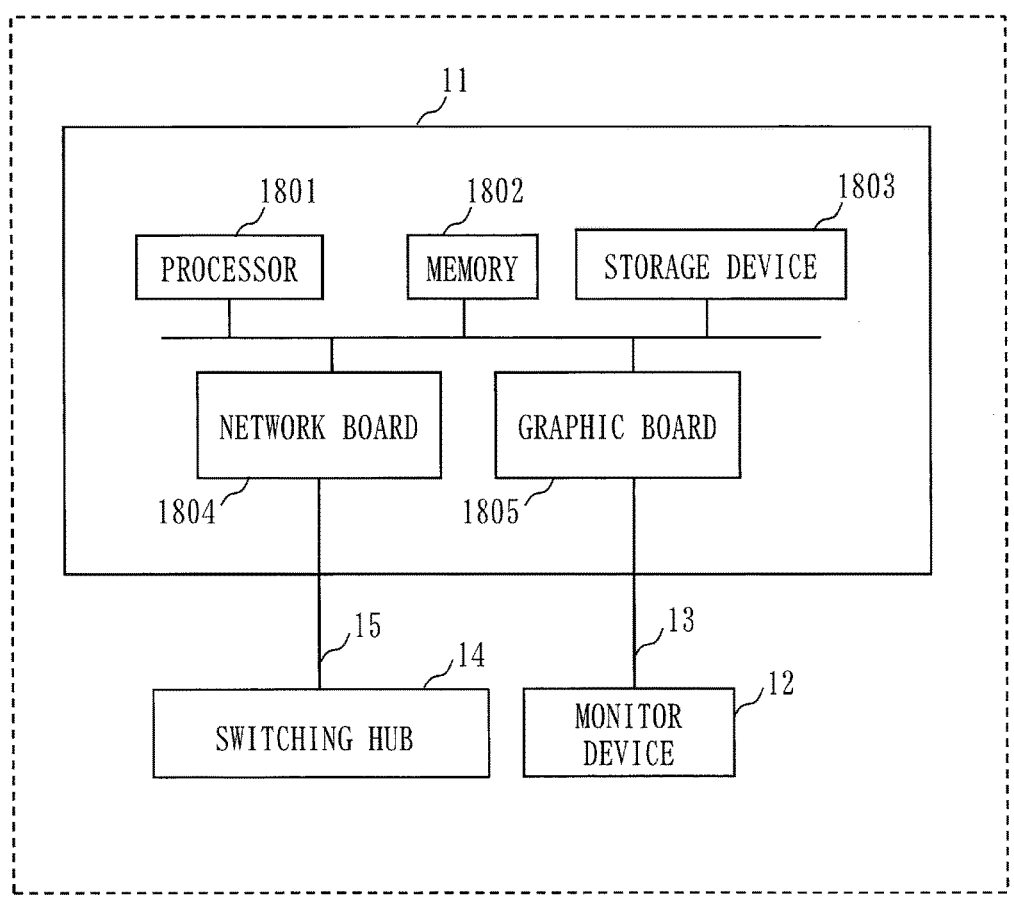
FIG. 18 is a diagram illustrating a hardware configuration example of the image receiving/reproducing device according to Embodiment 1.

Next, a hardware configuration example of the image receiving/reproducing device 11 is illustrated in FIG. 18.

The image receiving/reproducing device 11 is a computer having hardware: a processor 1801, a memory 1802, a storage device 1803, a network board 1804, and a graphic board 1805.

The processor 1801 is, for example, a CPU. The processor 1801 executes a program. More specifically, the processor 1801 executes a program that implements functional component elements illustrated in FIG. 3. The details of the functional component elements illustrated in FIG. 3 will be described later.

The memory 1802 is a volatile storage device and, specifically, RAM.

The storage device 1803 is a nonvolatile storage device and, specifically, an HDD or flash memory.

The program which the processor 1801 executes is stored in the storage device 1803, and is loaded into the memory 1802 and executed by the processor 1801.

The network board 1804 is a circuit for performing transmission and reception of data with the switching hub 14.

The graphic board 1805 is a circuit for outputting the reproduction result of the divided image to the monitor device 12.

*Description of an Operation*

Next, an operation of the image generating/transmitting device 10 according to the present embodiment will be described by using a functional configuration example illustrated in FIG. 2.

A connection information managing section 21 manages connection information. More specifically, the connection information managing section 21 generates connection information and transmits the generated connection information from the network board 1704 by using a setting data transmitting section 28. The transmitted connection information is received by each image receiving/reproducing device 11 by way of the switching hub 14.

The connection information managing section 21 may regularly transmit the connection information or may transmit the connection information only once and make each image receiving/reproducing device 11 store the connection information as stationary information.

Figures 10, 11:
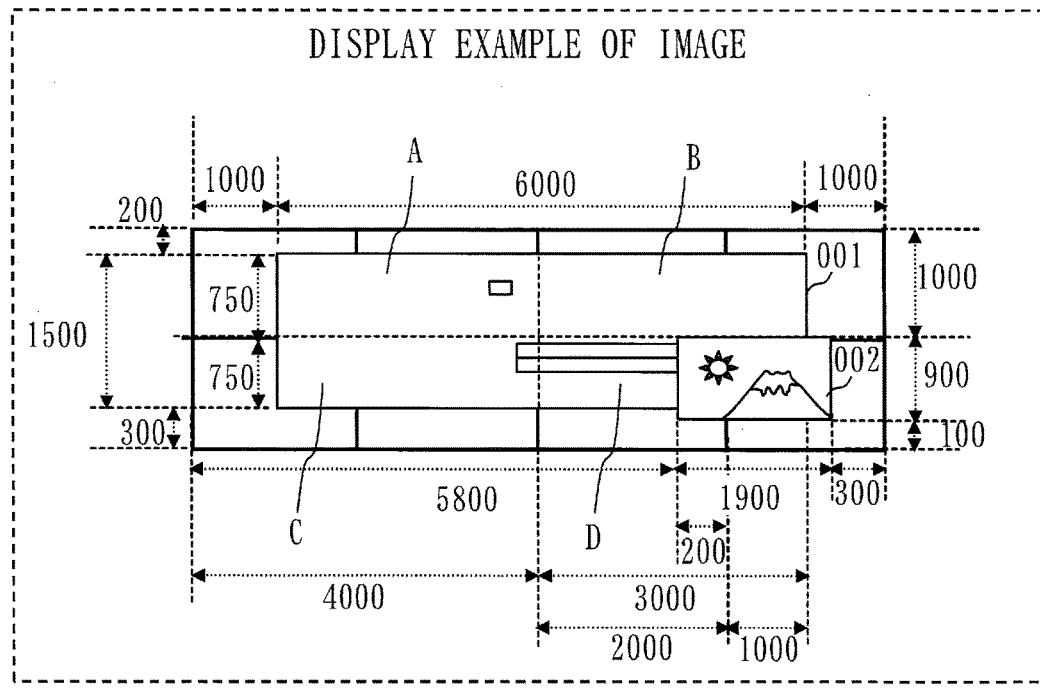
FIG. 10 is a diagram illustrating an example of connection information according to Embodiment 1.
FIG. 11 is a diagram illustrating a display example of an image according to Embodiment 1.

FIG. 10 illustrates an example of the connection information.

In the connection information, as illustrated in FIG. 10, a monitor position, a monitor size (resolution), a receiving device ID, the number of screens, and an IP address are described for each screen ID.

The screen ID indicates the screen ID illustrated in FIG. 1.

The monitor position indicates the position of each monitor device 12. The monitor position indicates, in the example of FIG. 1, the position of a point located in the upper-left part of each monitor device 12.

The monitor size indicates the size of each monitor device 12. In the present embodiment, all the monitor devices 12 have a common size, which is horizontal 2000 dots and vertical 1000 dots.

The values described in the monitor position and the monitor size are values of the coordinates which are set on the multi-large screen (hereinafter referred to as screen coordinates). In the screen coordinates of the FIG. 10, a pixel located on the upper-left part of the multi-large screen is treated as the origin (horizontal: 0, vertical: 0).

In FIG. 1, the monitor device 12 with the screen ID: 001 is placed in the upper-left part of the multi-large screen; therefore, also in the connection information of FIG. 10, the monitor position of the screen ID: 001 is described as "horizontal: 0, vertical: 0". Moreover, since the monitor size is horizontal 2000 dots and vertical 1000 dots, a region occupied by the monitor device 12 with the screen ID: 001 on the multi-large screen is from "horizontal: 0" to "horizontal: 2000" in a horizontal direction and from "vertical: 0" to "vertical: 1000" in a vertical direction. As described above, in the connection information, a region occupied by each monitor device 12 on the multi-large screen is defined by the screen coordinates.

Furthermore, in FIG. 10, the receiving device ID is an ID of the image receiving/reproducing device 11 to which each monitor device 12 is connected. In the row of the screen ID: 001, "11a" is described, which indicates that the monitor device 12 with the screen ID: 001 is connected to the image receiving/reproducing device 11a.

The number of screens is the number of monitor devices 12 which are connected to the image receiving/reproducing device 11 described in the field of the receiving device ID. In the present embodiment, since one monitor device 12 is connected to each image receiving/reproducing device 11, the number of screens is "1" in each row.

The IP address indicates the IP (Internet Protocol) address of the image receiving/reproducing device 11. In the row of the screen ID: 001, the IP address of the image receiving/reproducing device 11a is described.

Figure 2:
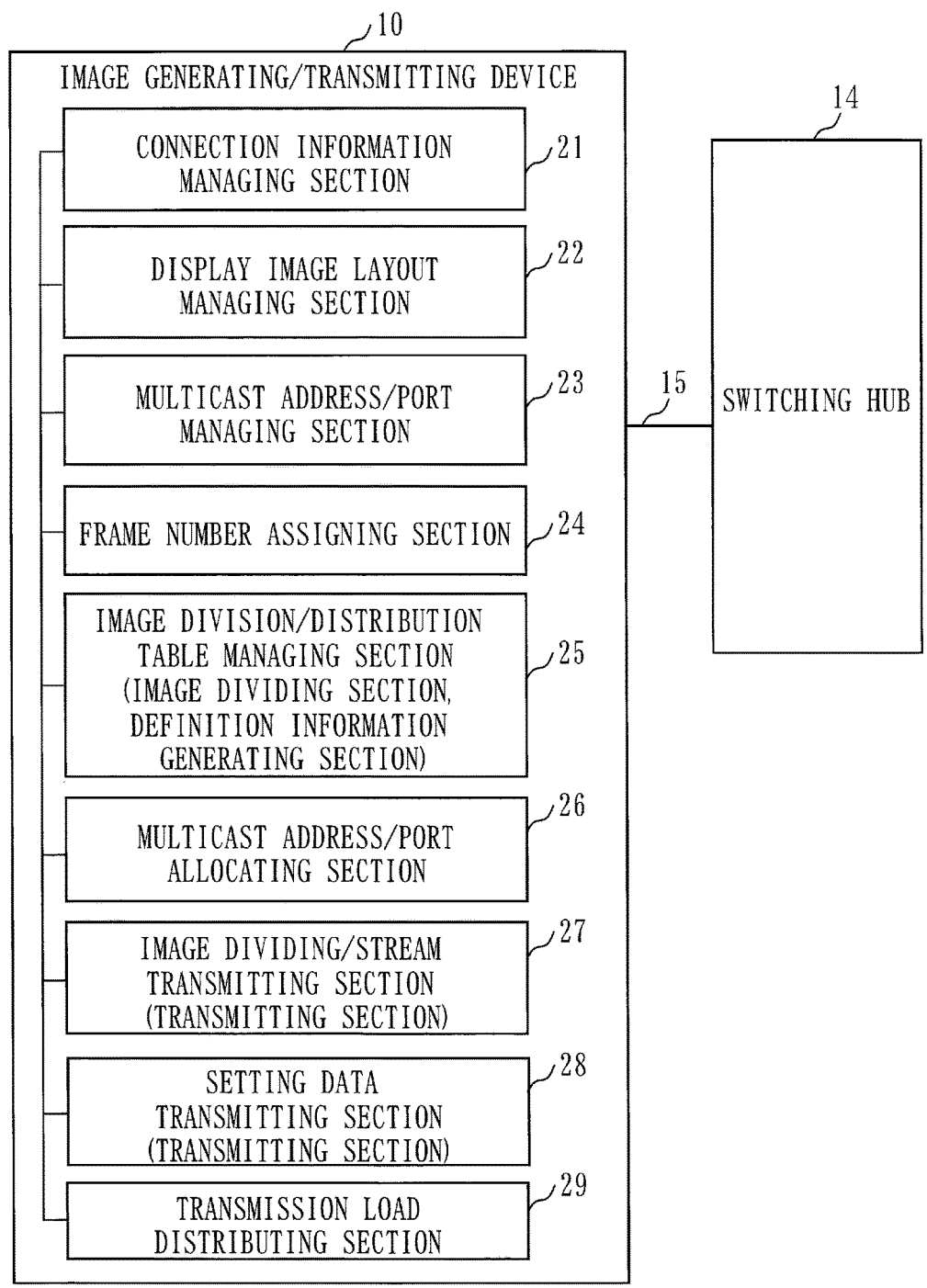
FIG. 2 is a diagram illustrating a functional configuration example of an image generating/transmitting device according to Embodiment 1.

Back in FIG. 2, a display image layout managing section 22 manages display image layout information. In the display image layout information, the display position of an image, which is displayed on the multi-large screen, on the multi-large screen is described. In the display image layout information, the depth (the relationship of overlap) of a plurality of images is also described. The display image layout information is generated by an application program in the image generating/transmitting device 10, for instance. Moreover, the display image layout information is sometimes generated by an application program outside the image generating/transmitting device 10. The display image layout managing section 22 sometimes changes the display image layout information. The display image layout information is stored in the memory 1702 and transmitted to the switching hub 14 from the network board 1704 by the setting data transmitting section 28. Furthermore, the display image layout information is transmitted to each image receiving/reproducing device 11 from the switching hub 14.

FIG. 12 illustrates an example of the display image layout information about a screen display example of FIG. 11.

FIG. 11 illustrates an example in which two images are displayed on the multi-large screen of FIG. 1.

A large image near the center of FIG. 11 is an image with an image ID: 001, and a small image in a lower-right part is an image with an image ID: 002.

The display image layout information is configured with resolution for display on the multi-large screen, a relative position with respect to the multi-large screen, a title by which an image is identified, and a depth. The "resolution for display" is unrelated to the size of an image which is transmitted from the image generating/transmitting device 10, and means the resolution of an image when the image is displayed on the multi-large screen. The resolution which is indicated in the "resolution for display" of the display image layout information of FIG. 12 is equal to the resolution shown in FIG. 13. If an image which is transmitted from the image generating/transmitting device 10 has a size of horizontal: 12000 and vertical: 3000, an image reduced vertically and horizontally by ½ and in area by ¼ as compared to the image which is transmitted from the image generating/transmitting device 10, is displayed on the multi-large screen. As described above, the image receiving/reproducing device 11 can determine an enlargement ratio or a reduction ratio at the time of display of an image based on the resolution of an image shown in FIG. 13 and the "resolution for display" shown in FIG. 12. The "relative position with respect to the multi-large screen" indicates a position on the multi-large screen from which an image is displayed, as a starting point. The "resolution for display" means a size into which an image is extended using the point identified by the "relative position with respect to the multi-large screen" as the starting point. The image receiving/reproducing device 11 can grasp the display status of each image on the multi-large screen based on the display image layout information of FIG. 12. Thus, the image receiving/reproducing device 11 can identify an image overlapping with a region (a connected monitor region) occupied by the connected monitor device, which is identified by the connection information of FIG. 10, on the multi-large screen.

It is to be noted that, when extracting a receiving target divided image from a plurality of divided images, each image receiving/reproducing device 11 refers to an image division/distribution table shown in FIG. 13. The details of the image division/distribution table of FIG. 13 will be described later.

Back in FIG. 2, a multicast address/port managing section 23 manages sets of a multicast address and a port. The multicast address and the port are communication addresses which are used when the image receiving/reproducing device 11 acquires a divided image from the switching hub 14.

It is to be noted that, when a plurality of image generating/transmitting devices 10 are placed in the multi-large-screen system, which will be described in Embodiment 2, a set of a multicast address and a port is not allowed to overlap between the image generating/transmitting devices 10. Sets of available multicast addresses and available ports are stored in the storage device 1703 in an initial state. The sets of available multicast addresses and available ports may be updated in the storage device 1703. Moreover, the speed of processing may be improved by copying the sets of available multicast addresses and available ports to the memory 1702 and updating the sets of available multicast addresses and available ports in the memory 1702.

A frame number assigning section 24 captures an image generated by an application program, an image of a desktop, or the like and assigns a frame number to the captured image in chronological order. For example, when the frame number assigning section 24 performs 30 capture operations per second and transmits the captured images, the transmission rate is 30 frames per second. The frame number assigning section 24 assigns an identification number to each captured screen captured in one operation. By doing so, even when an image is divided and transmitted, the image receiving/reproducing device 11 can acknowledge that the images are images at the same moment by referring to the frame numbers.

An image division/distribution table managing section 25 divides the image captured by the frame number assigning section 24 in the form of a mesh. That is, the image division/distribution table managing section 25 divides an image which is displayed on the multi-large screen into a plurality of divided images. Then, the image division/distribution table managing section 25 generates an image division/distribution table. Moreover, the image division/distribution table managing section 25 transmits the image division/distribution table from the network board 1704 by using the setting data transmitting section 28. The transmitted image division/distribution table is received by each image receiving/reproducing device 11 by way of the switching hub 14. The image division/distribution table is information that defines a display region of each divided image on the multi-large screen, by using the screen coordinates. Moreover, the image division/distribution table defines, for each divided image, a set of a multicast address and a port which is used by the image receiving/reproducing device 11 to receive a divided image from the switching hub 14. The image division/distribution table corresponds to divided image definition information.

The image division/distribution table managing section 25 corresponds to an image dividing section and a definition information generating section. Moreover, an operation which is performed by the image division/distribution table managing section 25 corresponds to an image division process and a definition information generation process.

FIG. 13 illustrates an example of the image division/distribution table.

An image division/distribution table of (a) of FIG. 13 is an image division/distribution table about the image with the image ID: 001 of FIG. 12.

An image division/distribution table of (b) of FIG. 13 is an image division/distribution table about the image with the image ID: 002 of FIG. 12.

Hereinafter, the image division/distribution table of (a) of FIG. 13 will be described.

As indicated in the "number of divisions" of the image division/distribution table of (a) of FIG. 13, here, the image with the image ID: 001 is divided into four divided images by the image division/distribution table managing section 25.

A "division ID" is an identifier of a divided image. "A", "B", "C", and "D" shown in (a) of FIG. 13 correspond to "A", "B", "C", and "D" shown in FIG. 11.

A "relative position with respect to the multi-large screen" indicates a position on the multi-large screen from which a divided image is displayed, as a starting point. A "rectangular size" means a size into which a divided image is extended using the point identified by the "relative position with respect to the multi-large screen" as the starting point. A value indicated in the "relative position with respect to the multi-large screen" and a value indicated in the "rectangular size" are values on the screen coordinates.

A divided image with a division ID: A (hereinafter referred to as a divided image A) is an image having an area of "horizontal: 3000"×"vertical: 750", whose upper-left point is placed in a position of "horizontal: 1000" and "vertical: 200".

Likewise, a divided image with a division ID: B is an image having an area of "horizontal: 3000"×"vertical: 750", whose upper-left point is placed in a position of "horizontal: 4000" and "vertical: 200".

As described above, the image division/distribution table defines a display region of each divided image on the multi-large screen by using the screen coordinates.

By referring to a display region of each divided image shown in the image division/distribution table, the image receiving/reproducing device 11 can extract, as a receiving target divided image, a divided image whose display region overlaps with a connected monitor region.

Moreover, in a "multicast address" and a "port number", a multicast address and a port number which are used when the image receiving/reproducing device 11 acquires each divided image from the switching hub 14 are shown.

That is, the image receiving/reproducing device 11 can receive a receiving target divided image from the switching hub 14 by presenting a multicast address and a port number of the receiving target divided image to the switching hub 14.

The image receiving/reproducing device 11a extracts the divided image A as a receiving target divided image. Then, the image receiving/reproducing device 11a receives the divided image A from the switching hub 14 by transmitting to the switching hub 14, a request containing a "multicast address: 239.1.1.1" and a "port number: 50002" of the divided image A.

It is to be noted that a "transfer rate" is a rate at which the switching hub 14 transfers each divided image to the image receiving/reproducing device 11.

Back in FIG. 2, a multicast address/port allocating section 26 allocates a set of a multicast address and a port to each divided image. The multicast address/port allocating section 26 allocates a set of a multicast address and a port to each divided image in such a way that a set of a multicast address and a port does not overlap between divided images. Moreover, the multicast address/port allocating section 26 manages the status of use (being used/not used) of a set of a multicast address and a port. By managing the status of use of a set of a multicast address and a port, the multicast address/port allocating section 26 can allocate to a divided image, a set of a multicast address and a port which is not currently used.

An image dividing/stream transmitting section 27 distributes a divided image in accordance with an attribute described in the image division/distribution table. More specifically, the image dividing/stream transmitting section 27 associates with a divided image, a set of a multicast address and a port number described in the image division/distribution table, and transmits the divided image to the switching hub 14. Moreover, the image dividing/stream transmitting section 27 assigns a frame number to the divided image. The image dividing/stream transmitting section 27 may transmit the divided image in accordance with the existing RTP (Realtime Transport Protocol) or may transmit the divided image in accordance with its own transmission protocol. Furthermore, the image dividing/ stream transmitting section 27 may determine a transmission unit (a size) of the divided image in accordance with RTP or may determine a transmission unit (a size) of the divided image in accordance with its own transmission protocol.

It is to be noted that the image dividing/stream transmitting section 27 corresponds to a transmitting section, together with the setting data transmitting section 28 which will be described later. Moreover, an operation which is performed by the image dividing/stream transmitting section 27 corresponds to a transmission process.

The setting data transmitting section 28 transmits to the switching hub 14, setting data which the image receiving/ reproducing device 11 requires. The setting data transmitting section 28 transmits, as the setting data, the connection information (FIG. 10), the display image layout information (FIG. 12), and the image division/distribution table (FIG. 13).

If the transmission frequency of all the setting data is the same, one setting data transmitting section 28 can transmit all the setting data. If transmission frequencies vary by setting data, the setting data transmitting section 28 may be provided for each setting data or one setting data transmitting section 28 may be configured so as to transmit all the setting data.

The setting data transmitting section 28 corresponds to the transmitting section together with the image dividing/stream transmitting section 27. Moreover, an operation which is performed by the setting data transmitting section 28 corresponds to the transmission process.

If a plurality of network boards 1704 are implemented in the image generating/transmitting device 10, a transmission load distributing section 29 performs a load distribution operation so that the transmission amounts of the network boards 1704 become equal to each other.

Next, an operation of the image receiving/reproducing device 11 according to the present embodiment will be described by using a functional configuration example illustrated in FIG. 3.

A connected monitor region identifying section 30 receives, via the network board 1804, the connection information (FIG. 10) transmitted from the image generating/ transmitting device 10. Moreover, by referring to the connection information, the connected monitor region identifying section 30 identifies a connected monitor region, which is a region occupied by the connected monitor device on the multi-large screen, by using the screen coordinates.

For instance, the connected monitor device of the image receiving/reproducing device 11a is the monitor device 12 with the screen ID: 001. Thus, the connected monitor region identifying section 30 of the image receiving/reproducing device 11a identifies a connected monitor region based on "horizontal: 0, vertical: 0" (the monitor position) and "horizontal: 2000, vertical: 1000" (the monitor size) which are shown in the row of the "screen ID: 001" of the connection information.

The connected monitor region identifying section 30 stores the received connection information in the storage device 1803 if the connection information is not regularly transmitted from the image generating/transmitting device 10. Moreover, the connected monitor region identifying section 30 stores the received connection information in the memory 1802 if the connection information is regularly transmitted from the image generating/transmitting device 10.

An operation which is performed by the connected monitor region identifying section 30 corresponds to a region identification process.

A display image managing section 31 receives, via the network board 1804, the display image layout information (FIG. 12) transmitted from the image generating/transmitting device 10. Moreover, the display image managing section 31 identifies an image to be displayed on the connected monitor device based on the region of an image shown in the display image layout information and the connected monitor region identified by the connected monitor region identifying section 30.

For example, the display image managing section 31 of the image receiving/reproducing device 11a identifies the image with the image ID: 001 as an image to be displayed on the monitor device 12 with the screen ID: 001 which is the connected monitor device.

Since the display image layout information is information which is valid only while the multi-large-screen system is operating, it is possible to improve the speed of processing by storing the display image layout information in the memory 1802. Moreover, every time the display image layout information is updated, the updated display image layout information may be stored in the storage device 1803. By doing so, when the image receiving/reproducing device 11 is rebooted, the image receiving/reproducing device 11 can output an image to the connected monitor device immediately after being rebooted.

Furthermore, the display image managing section 31 receives, via the network board 1804, the image division/distribution table (FIG. 13) transmitted from the image generating/transmitting device 10.

The display image managing section 31 corresponds to a receiving section. Moreover, an operation which is performed by the display image managing section 31 corresponds to a reception process.

A received stream recognizing section 32 extracts a receiving target divided image based on the display region of a divided image which is shown in the image division/distribution table and the connected monitor region identified by the connected monitor region identifying section 30. Furthermore, the received stream recognizing section 32 extracts a reproduction target range based on the display region of a divided image which is shown in the image division/distribution table and the connected monitor region identified by the connected monitor region identifying section 30.

More specifically, the received stream recognizing section 32 extracts, as the receiving target divided image, a divided image whose display region defined in the image division/distribution table overlaps at least partially with the connected monitor region. Moreover, the received stream recognizing section 32 extracts, as the reproduction target range, a range of the receiving target divided image, the range which overlaps with the connected monitor region.

For instance, in the image receiving/reproducing device 11a, the display image managing section 31 identifies the image with the image ID: 001 as an image to be displayed on the connected monitor device by referring to the display image layout information. Then, the received stream recognizing section 32 extracts the divided image A as the receiving target divided image by referring to the image division/distribution table about the image with the image ID: 001. Furthermore, the received stream recognizing section 32 extracts, as the reproduction target range, a range of the divided image A, the range which overlaps with the connected monitor region.

Moreover, if a plurality of receiving target divided images is extracted, and any reproduction target range among a plurality of reproduction target ranges extracted from the extracted receiving target divided images placed behind another reproduction target range and is not displayed by the connected monitor device, the received stream recognizing section 32 may instruct a stream receiving/displaying section 33 not to receive a receiving target divided image including a reproduction target range which is not displayed by the connected monitor device. Furthermore, the received stream recognizing section 32 may instruct the stream receiving/displaying section 33 not to reproduce a reproduction target range which is not displayed by the connected monitor device.

For example, the received stream recognizing section 32 of the image receiving/reproducing device 11h extracts, as the receiving target divided images, a divided image with a division ID: D in the image ID: 001 (hereinafter referred to as a 001 divided image D) and a divided image with the division ID: A of the image ID: 002 (hereinafter referred to as a 002 divided image A). However, as illustrated in FIG. 11, the 001 divided image D lies hidden behind the 002 divided image A and is not displayed. Thus, the received stream recognizing section 32 of the image receiving/reproducing device 11h instructs the stream receiving/displaying section 33 not to receive the 001 divided image D or instructs the stream receiving/displaying section 33 not to reproduce a reproduction target range of the 001 divided image D. This makes it possible to reduce an image reception load or an image reproduction load in the image receiving/reproducing device 11.

It is to be noted that the received stream recognizing section 32 corresponds to an extracting section. Moreover, an operation which is performed by the received stream recognizing section 32 corresponds to an extraction process.

The stream receiving/displaying section 33 receives from the switching hub 14, the receiving target divided image which has been extracted by the received stream recognizing section 32. More specifically, the stream receiving/displaying section 33 receives the receiving target divided image from the switching hub 14, by transmitting a request containing a multicast address and a port number of the receiving target divided image to the switching hub 14. Moreover, the stream receiving/displaying section 33 reproduces only the reproduction target range of the receiving target divided image received and outputs the reproduction result of the reproduction target range to the connected monitor device.

It is to be noted that the stream receiving/displaying section 33 corresponds to a reproducing section. Furthermore, an operation which is performed by the stream receiving/displaying section 33 corresponds to a reproduction process.

Figure 5:
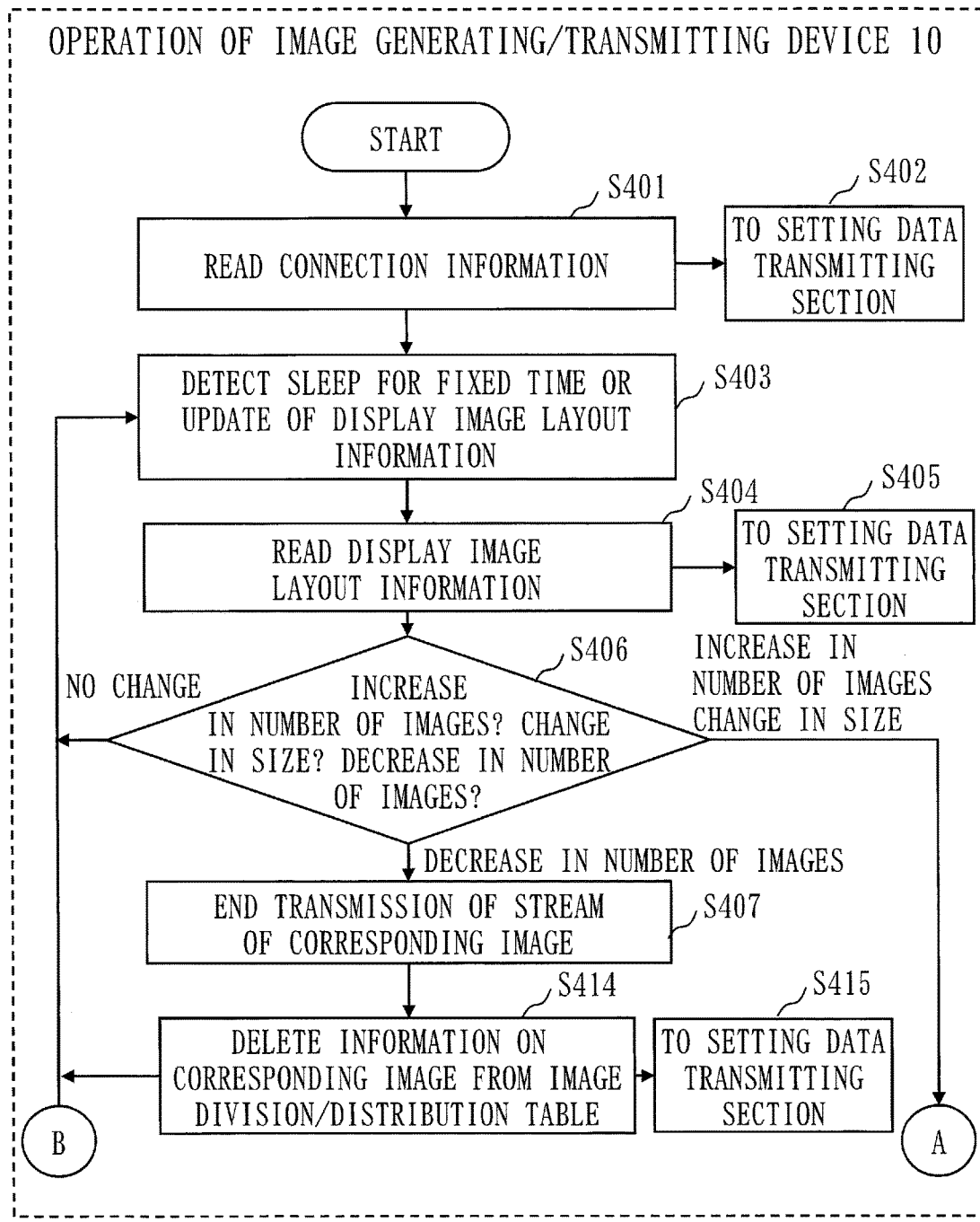
FIG. 5 is a flowchart diagram illustrating an operation example of the image generating/transmitting device according to Embodiment 1.
Figure 6:
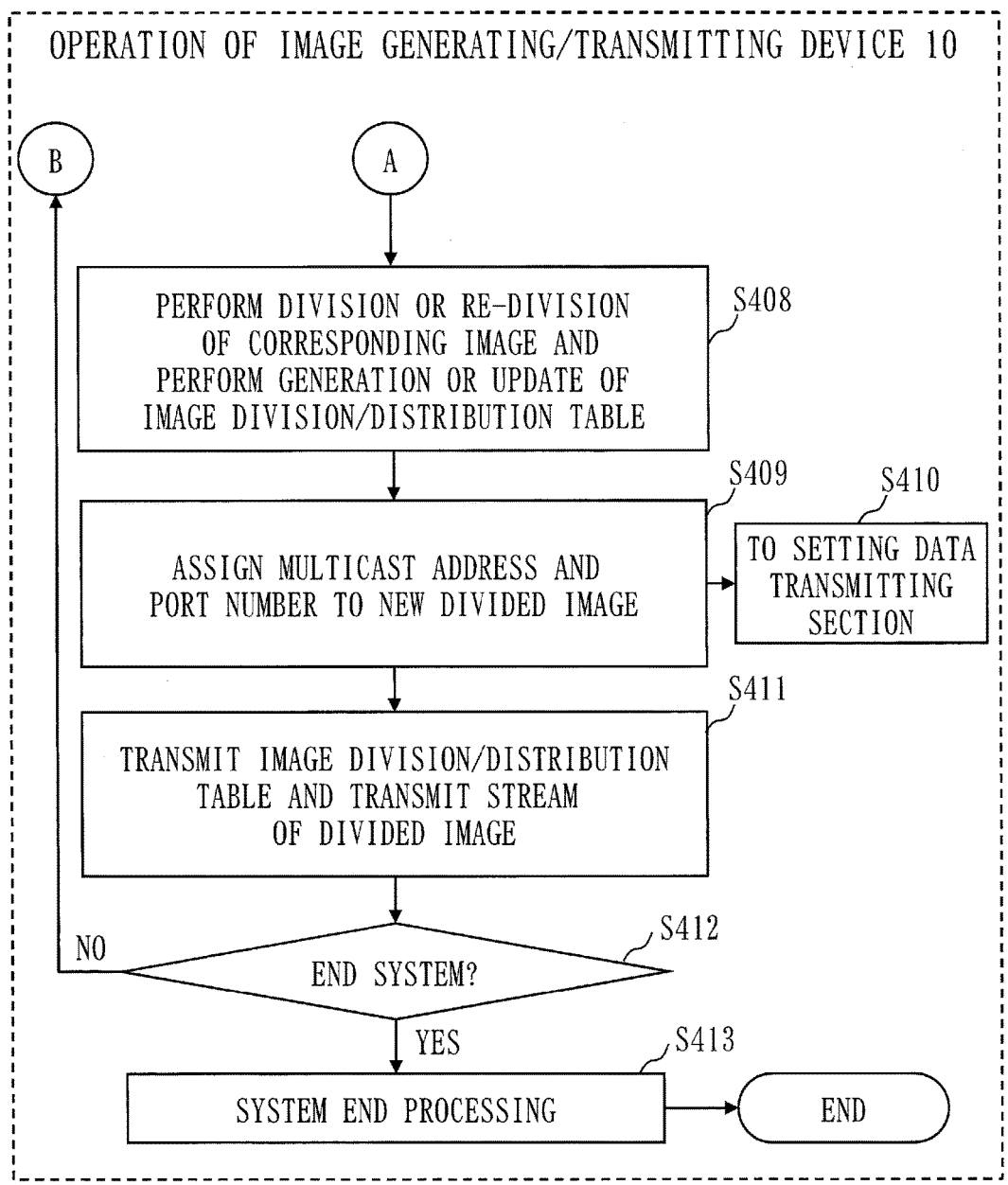
FIG. 6 is a flowchart diagram illustrating an operation example of the image generating/transmitting device according to Embodiment 1.

Next, an operation example of the image generating/transmitting device 10 will be described by using flowcharts of FIGS. 5 and 6.

First, in Step 401, the connection information managing section 21 reads the connection information of the multi-large-screen system from the memory 1702 or the storage device 1703. In the image generating/transmitting device 10, the connection information is used to identify the position of each image on the multi-large screen when the display image layout information is generated. Moreover, the connection information is used by each image receiving/reproducing device 11 to identify the connected monitor region.

Furthermore, the connection information managing section 21 transfers the connection information to the setting data transmitting section 28 in Step 402. The setting data transmitting section 28 transmits the connection information from the network board 1704. The transmitted connection information is received by each image receiving/reproducing device 11 by way of the switching hub 14.

Next, in Step 403, the display image layout managing section 22 waits for update of the display image layout information. In so doing, the display image layout managing section 22 may check, at fixed intervals, whether or not the display image layout information has been updated. Moreover, the display image layout managing section 22 may enter a sleep state and terminate the sleep state with timing of update of the display image layout information performed by an application program.

Since update of the display image layout information is timing of termination of sleep, the display image layout information may be updated by, for example, a PC which is different from the image receiving/reproducing device 11 and notification of the update of the display image layout information may be provided to the display image layout managing section 22 from the PC. It is to be noted that the display image layout managing section 22 may terminate the sleep state by any method.

Next, in Step 404, the display image layout managing section 22 reads the display image layout information from the memory 1702 or the storage device 1703.

Moreover, the display image layout managing section 22 transfers the display image layout information to the setting data transmitting section 28 in Step 405. The setting data transmitting section 28 transmits the connection information from the network board 1704. The transmitted connection information is received by each image receiving/reproducing device 11 by way of the switching hub 14.

Next, in Step 406, the display image layout managing section 22 checks whether or not the contents of the display image layout information have changed by closely examining the display image layout information.

If the contents of the display image layout information have not changed, the procedure goes back to Step 403.

If there is a decrease in the number of images in the display image layout information, in Step 407, the display image layout managing section 22 performs processing to end transmission of the stream of the image deleted from the display image layout information (Step 407). Specifically, the display image layout managing section 22 instructs the image dividing/stream transmitting section 27 to end transmission of the stream of the corresponding image. The image dividing/stream transmitting section 27 ends transmission of the stream of the corresponding image.

Moreover, in Step 414, the image division/distribution table managing section 25 deletes, from the image division/distribution table, the information on the image deleted from the display image layout information. Furthermore, the setting data transmitting section 208 transmits, in Step 415, the image division/distribution table updated in Step 414. Then, the procedure goes back to Step 403.

If there is an increase in the number of images or a change in the size of an image in the display image layout information, in Step 408, the image division/distribution table managing section 25 performs division of the new image added to the display image layout information into a plurality of divided images or re-division of the image whose size has changed. The image division/distribution table managing section 25 divides or re-divides an image to be subjected to division or re-division into a predetermined rectangular size. Furthermore, in Step 408, the image division/distribution table managing section 25 performs generation of an image division/distribution table of the new image or update of the image division/distribution table of the image whose size has changed.

Next, in Step 409, the image division/distribution table managing section 25 inquires of the multicast address/port allocating section 26 about unused sets of multicast and a port number. Furthermore, in Step 409, the image division/distribution table managing section 25 assigns the multicast address and the port number of which notification has been provided by the multicast address/port allocating section 26 to the divided image of the image division/distribution table generated in Step 408 or the divided image added to the image division/distribution table in Step 408. On completion of Step 409, the image division/distribution table is completed.

Next, in Step 410, the image division/distribution table managing section 25 transmits the completed image division/distribution table via the setting data transmitting section 28 and further transmits the stream of the corresponding divided image via the image dividing/stream transmitting section 27.

More specifically, the image division/distribution table managing section 25 transfers the completed image division/distribution table to the setting data transmitting section 28, and the setting data transmitting section 28 transmits the image division/distribution table to a network from the network board 1704. Furthermore, the image division/distribution table managing section 25 starts or resets (if the size of the image which is already being transmitted is changed) the image dividing/stream transmitting section 27. The image dividing/stream transmitting section 27 starts or resets transmission of the stream in accordance with the information described in the new image division/distribution table. In so doing, the image dividing/stream transmitting section 27 assigns the frame number generated by the frame number assigning section 24 to the stream of the divided image and transmits the stream of the divided image to which the frame number has been assigned.

Moreover, at the time of transmission of the stream, the transmission load distributing section 29 checks the transmission status of physical ports and selects a low-transmission-load port. Such a load distribution operation of the transmission load distributing section 29 makes trouble in transmission caused by over transmission capacity less likely to occur even in a popular low-cost, low-transmission-capacity network.

In the image generating/transmitting device 10, a series of operations such as capture of an image, assignment (increment) of a frame number, division of an image, allotment of a set of a multicast address and a port which is set for each divided image, generation of an image division/distribution table, transmission of the image division/distribution table, and transmission of a stream is repeated until the end of display or change of a transmission method such as change in the size of an image.

Next, if an end instruction of the multi-large-screen system is received in Step 412, system end processing is performed in Step 413. In the system end processing, the image dividing/stream transmitting section 27 stops transmission of all the streams of the divided image started in Step 411. Moreover, the image dividing/stream transmitting section 27 returns to the multicast address/port managing section 23, a set of a multicast address and a port used in the transmission of the stream. Furthermore, the image division/distribution table managing section 25 abandons the image division/distribution table.

On the other hand, if there is no end instruction of the multi-large-screen system, the procedure goes back to Step 403.

Next, an operation of the connected monitor region identifying section 30 of the image receiving/reproducing device 11 will be described by using a flowchart of FIG. 7.

In Step 501, the connected monitor region identifying section 30 receives the connection information transmitted from the image generating/transmitting device 10. Moreover, the connected monitor region identifying section 30 stores the received connection information in the memory 1802 or the storage device 1803.

Next, in Step 502, the connected monitor region identifying section 30 identifies the connected monitor region based on the connection information. It is to be noted that the details of the method of identifying the connected monitor region are the same as those described above. The connected monitor region identifying section 30 stores the information on the identified connected monitor region in the memory 1802.

Next, an operation of the display image managing section 31 of the image receiving/reproducing device 11 will be described by using a flowchart of FIG. 8.

In Step 601, the display image managing section 31 receives the display image layout information transmitted from the image generating/transmitting device 10. Moreover, the display image managing section 31 stores the display image layout information in the memory 1802 or the storage device 1803.

Next, in Step 602, the display image managing section 31 receives the image division/distribution table transmitted from the image generating/transmitting device 10. Moreover, the display image managing section 31 stores the image division/distribution table in the memory 1802 or the storage device 1803.

Next, in Step 603, the display image managing section 31 compares the display image layout information received before with the display image layout information received in Step 601.

Then, in Step 604, the display image managing section 31 determines whether or not there is a difference between the two pieces of display image layout information.

If there is a difference between the two pieces of display image layout information, the display image managing section 31 terminates sleep of the received stream recognizing section 32 in Step 605.

Then, the display image managing section 31 deletes the old display image layout information and the old image division/distribution table in Step 606.

Figure 8:
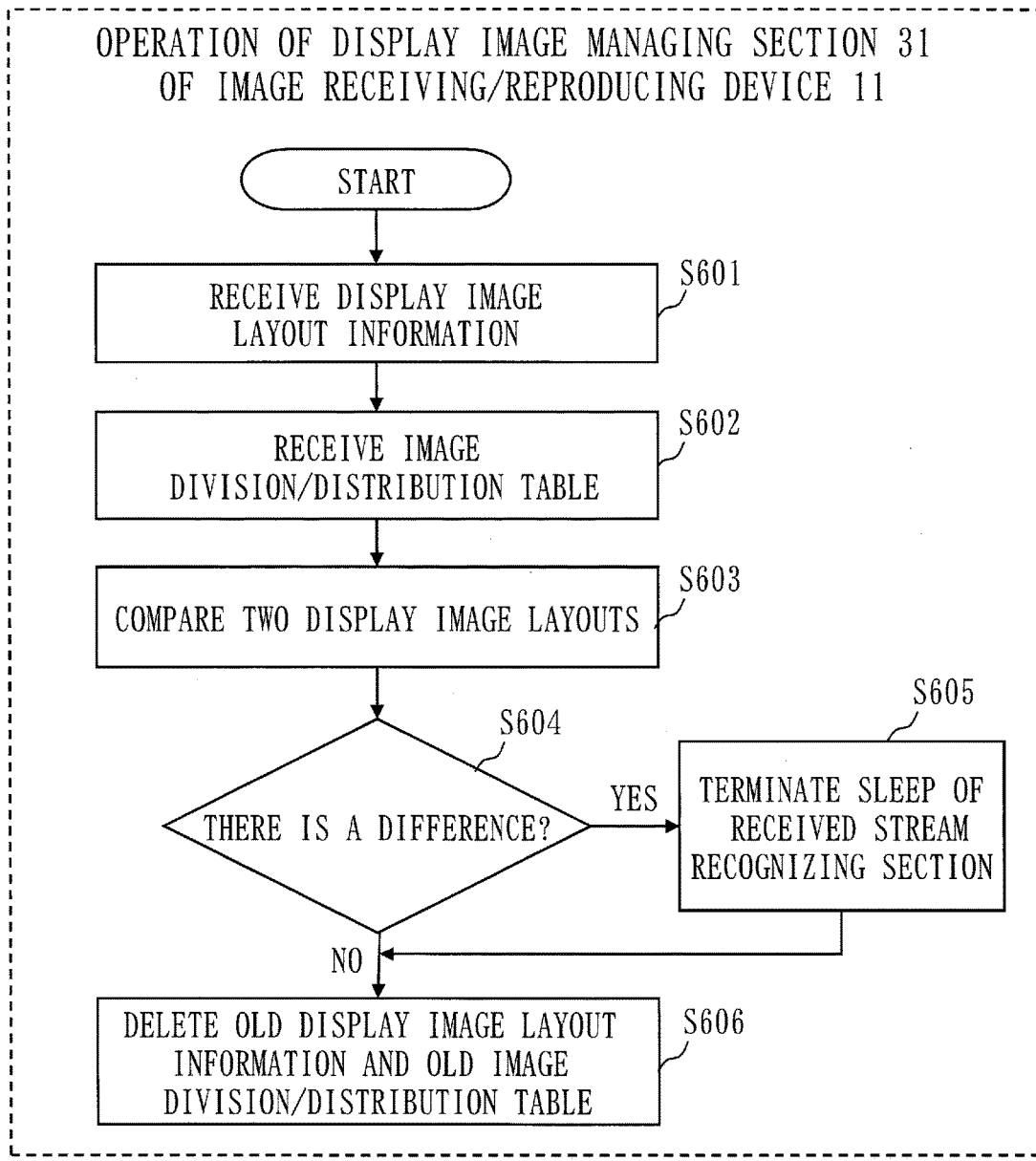
FIG. 8 is a flowchart diagram illustrating an operation example of a display image managing section of the image receiving/reproducing device according to Embodiment 1.

It is to be noted that, in the example of FIG. 8, the description is given based on the premise that the image division/distribution table is transmitted from the image generating/transmitting device 10 after the display image layout information; however, the display image layout information may be transmitted after the image division/distribution table.

Next, an operation of the received stream recognizing section 32 of the image receiving/reproducing device 11 will be described by using a flowchart of FIG. 9.

Figure 7:
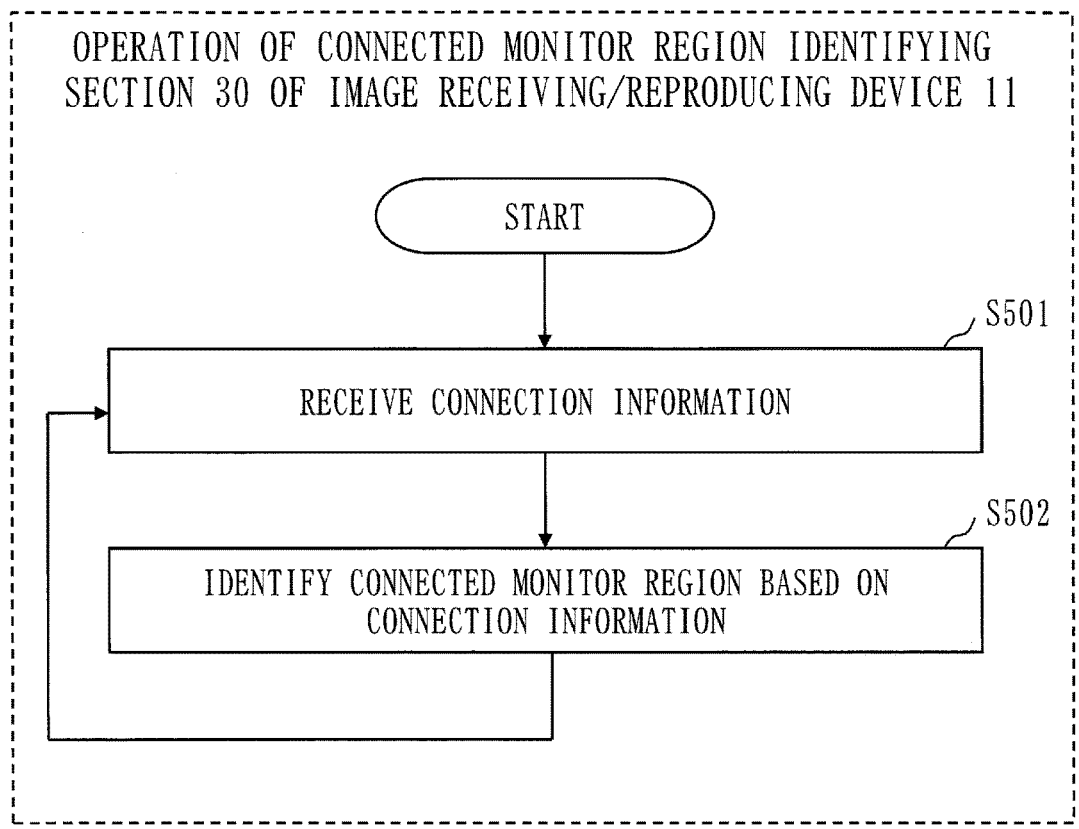
FIG. 7 is a flowchart diagram illustrating an operation example of a connected monitor region identifying section of the image receiving/reproducing device according to Embodiment 1.

When the received stream recognizing section 32 is started in Step 605 of FIG. 8, in Step 701, the received stream recognizing section 32 acquires from the memory 1802, the information on the connected monitor region obtained in Step 502 of FIG. 7.

Next, in Step 702, the received stream recognizing section 32 acquires from the memory 1802 or the storage device 1803, the image division/distribution table obtained in Step 602 of FIG. 8.

Next, in Step 703, the received stream recognizing section 32 extracts a receiving target divided image and a reproduction target range by checking the connected monitor region against the display region of each divided image described in the image division/distribution table. Then, the received stream recognizing section 32 generates a display list in which the extracted receiving target divided image and the extracted reproduction target range are described.

The method of extracting a receiving target divided image and a reproduction target range is the same as that described above. Moreover, the display list is information shown in FIG. 14, for example. The details of the display list will be described later.

Next, if a receiving target divided image and a reproduction target range have been extracted for all the images (YES in Step 704), in Step 705, the received stream recognizing section 32 transfers the display list generated in Step 703 and a set of a multicast address and a port number of the receiving target divided image, which is described in the image division/distribution table, to the stream receiving/displaying section 33.

Finally, in Step 706, the received stream recognizing section 32 transitions to a sleep state. If sleep of the received stream recognizing section 32 is terminated again by the display image managing section 31 in Step 605 of FIG. 8, the received stream recognizing section 32 starts processing from Step 702. That is, if sleep is terminated by the display image managing section 31 for the first time, the received stream recognizing section 32 starts processing from Step 701. On the other hand, in and after the second termination of sleep, since the information on the connected monitor region has already been acquired at the time of the first termination of sleep and the information on the connected monitor region does not change, the received stream recognizing section 32 starts processing from Step 702.

The stream receiving/displaying section 33 acquires the display list and the set of a multicast address and a port number of the receiving target divided image from the received stream recognizing section 32.

Then, as has been explained above, the stream receiving/displaying section 33 transmits to the switching hub 14, a request containing the set of the multicast address and the port number of the receiving target divided image, and receives the receiving target divided image from the switching hub 14. Moreover, the stream receiving/displaying section 33 selects a reproduction target range from the receiving target divided image in accordance with the description of the display list and reproduces the reproduction target range. Furthermore, if the stream receiving/displaying section 33 acquires from the received stream recognizing section 32, a new display list and a set of a multicast address and a port number of a new receiving target divided image, the stream receiving/displaying section 33 stops reception of the receiving target divided image which is currently being received and stops reproduction of the reproduction target range which is currently being reproduced. Then, in accordance with the new display list and the set of the multicast address and the port number of the new receiving target divided image which have been acquired from the received stream recognizing section 32, the stream receiving/displaying section 33 receives the new receiving target divided image and reproduces a new reproduction target range.

Figure 9:
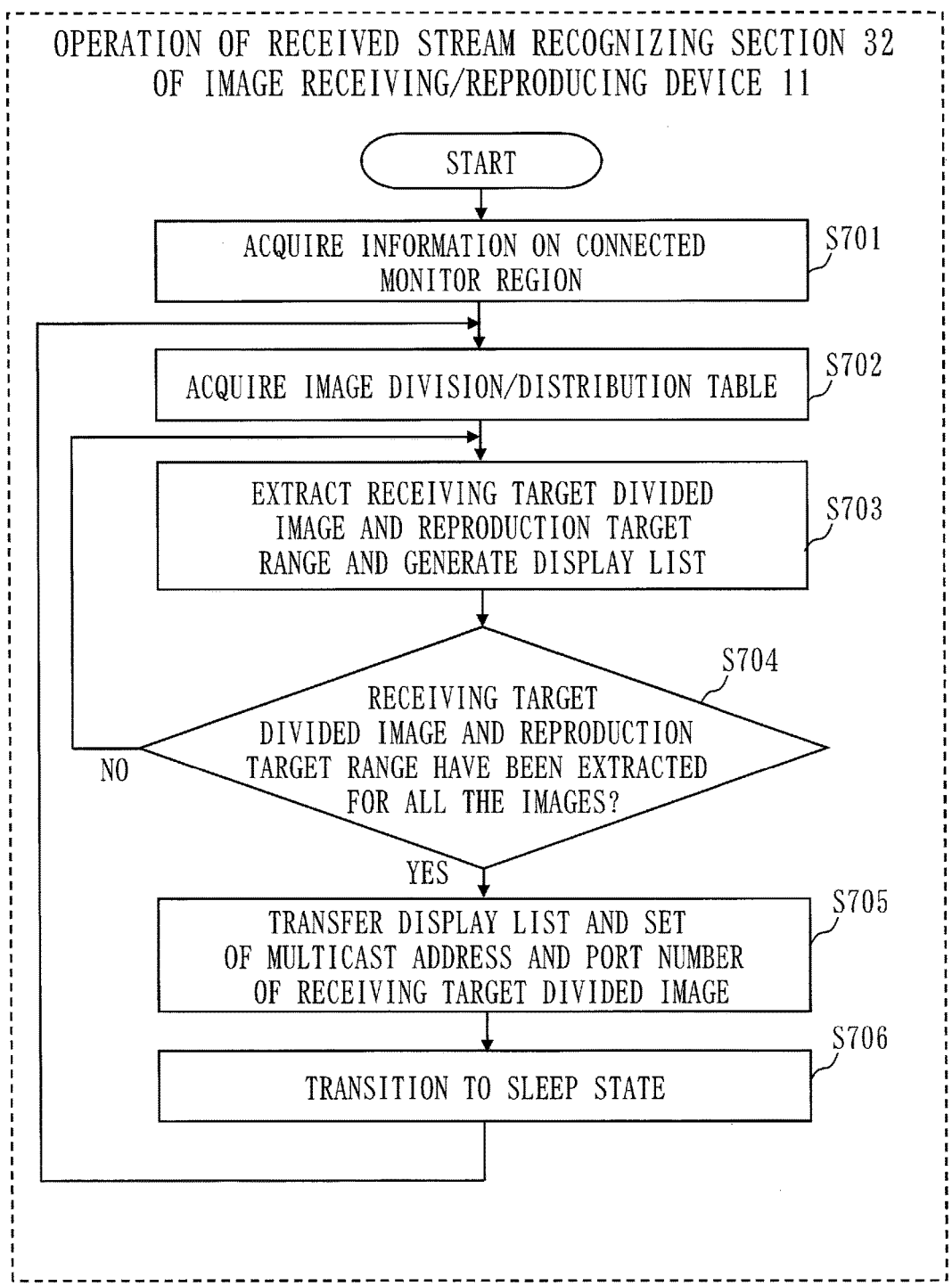
FIG. 9 is a flowchart diagram illustrating an operation example of a received stream recognizing section of the image receiving/reproducing device according to Embodiment 1.

FIG. 14 illustrates an example of the display list which is generated in Step 703 of FIG. 9.

FIG. 14 illustrates an example of a display list which is generated by the received stream recognizing section 32 of the image receiving/reproducing device 11h which is connected to the monitor device 12 with the screen ID: 008, when the image of FIG. 11 is displayed.

In FIG. 14, an "image ID" is the same as the "image ID" of FIG. 12. A "division ID" is the same as the "division ID" of FIG. 13.

By checking the connected monitor region against the display region of each divided image which is described in the image division/distribution table, the received stream recognizing section 32 of the image receiving/reproducing device 11h extracts, for the image with the image ID: 001, the divided image with the division ID: D (the 001 divided image D) as a receiving target divided image. Furthermore, the received stream recognizing section 32 of the image receiving/reproducing device 11h extracts, for the image with the image ID: 002, the divided image with the division ID: A (the 002 divided image A) as a receiving target divided image.

Moreover, by checking the connected monitor region against the display region of each divided image which is described in the image division/distribution table, the received stream recognizing section 32 of the image receiving/reproducing device 11h extracts a reproduction target range of the 001 divided image D and further extracts a reproduction target range of the 002 divided image A.

The starting point (the upper-left point) of the connected monitor region (an offset from the upper-left point of the multi-large screen) of the image receiving/reproducing device 11h is "horizontal: 6000" and "vertical: 1000". An offset of the 001 divided image D from the upper-left point of the multi-large screen is "horizontal: 4000" and "vertical: 1000". Moreover, the size of the 001 divided image D which is extended from the point of "horizontal: 4000" and "vertical: 1000" is "horizontal: 3000" and "vertical: 750". The received stream recognizing section 32 of the image receiving/reproducing device 11h designates, out of the region of the 001 divided image D, a range of a size of "horizontal: 1000"×"vertical: 750" dots from the position of "horizontal: 2000" and "vertical: 0" as a reproduction target range. Moreover, since the 001 divided image D is a divided image crossing the starting point (upper-left coordinates) of the connected monitor device, the position on the connected monitor device by which the starting point of the reproduction target range is displayed is a position of "horizontal: 0" and "vertical: 0" (the starting point of the connected monitor device). Furthermore, according to FIGS. 12 and 13, the scaling factor of the image with the image ID: 001 is 1.00, which is unmagnified. Thus, the connected monitor device displays the reproduction result obtained by the image receiving/reproducing device 11h without changing the resolution. Moreover, since the depth of the 001 divided image D is smaller than the depth of the 002 divided image A, the stream receiving/displaying section 33 reproduces the 001 divided image D and the 002 divided image A in such a way that the 001 divided image D is displayed behind the 002 divided image A.

Although the procedure by which a reproduction target range of the 001 divided image D is extracted has been described above, the received stream recognizing section 32 of the image receiving/reproducing device 11h can also extract a reproduction target range of the 002 divided image A by a similar procedure.

It is to be noted that, since the 001 divided image D lies hidden behind the 002 divided image A and the 001 divided image D is not displayed on the connected monitor device (the 001 divided image D is not visually recognized by the user), the received stream recognizing section 32 may be configured so as not to reproduce the 001 divided image D. Moreover, the received stream recognizing section 32 may be configured so as not to receive the 001 divided image D. As described above, by omitting reception of a receiving target divided image or reproduction of a reproduction target range, it is possible to reduce the processing load of the image receiving/reproducing device 11.

Description of the Effects of the Embodiment

In the present embodiment, the image generating/transmitting device divides one image into a plurality of multicast streams and transmits the multicast streams. Thus, since the image receiving/reproducing device only has to receive and reproduce only a stream containing a divided image which the connected monitor device displays, it is possible to reduce the reception load and the reproduction load of the image receiving/reproducing device.

Moreover, in the present embodiment, the image receiving/reproducing device can omit reception or reproduction of an image which is not displayed by being hidden behind another image. This makes it possible to reduce the reception load or the reproduction load of the image receiving/reproducing device.

Embodiment 2

In Embodiment 1, as illustrated in FIG. 1, a relatively simple multi-large-screen system including only one multi-large screen has been described.

Figure 4:
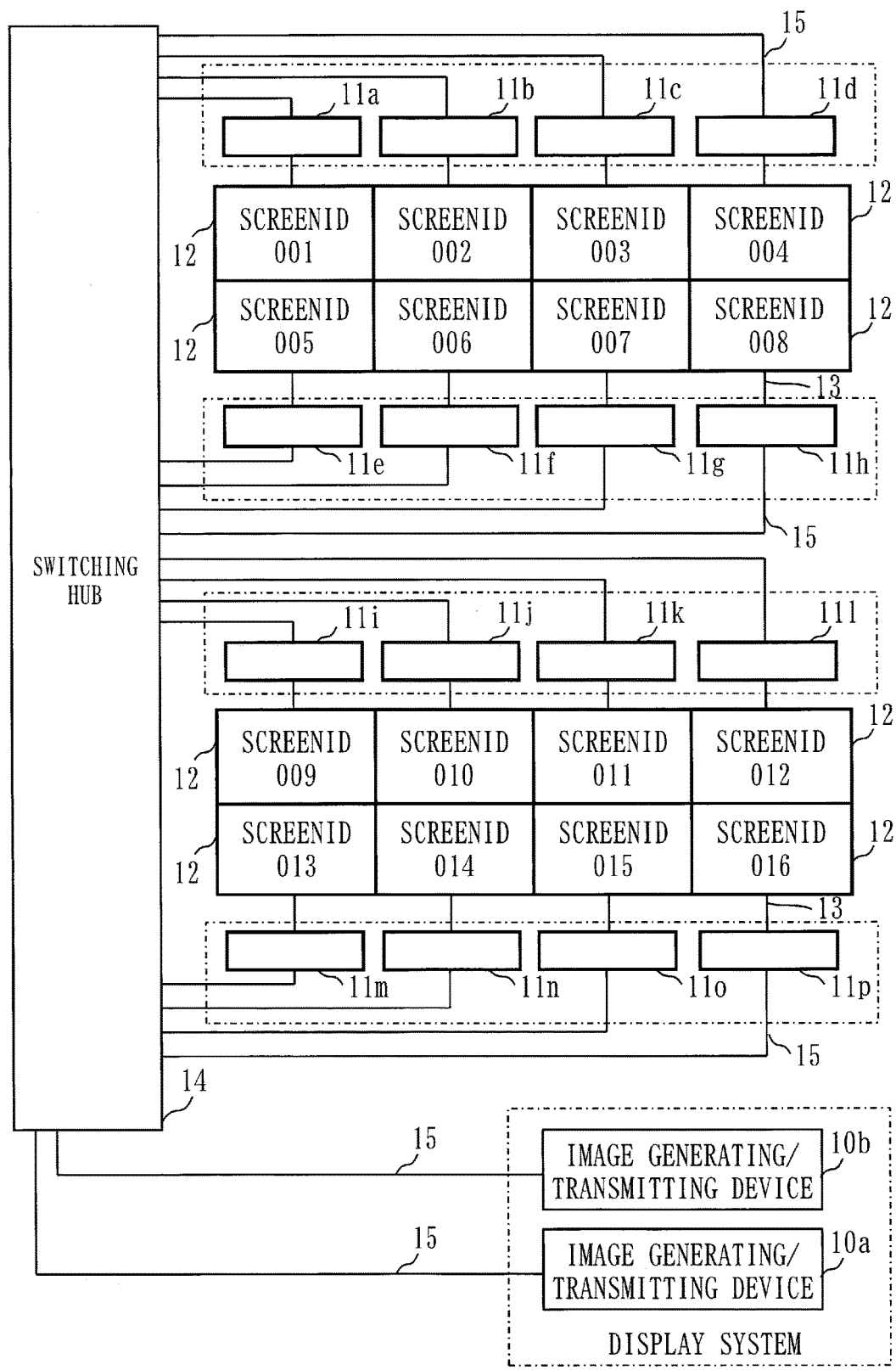
FIG. 4 is a diagram illustrating a configuration example of a multi-large-screen system according to Embodiment 2.

As illustrated in FIG. 4, it is also possible to configure a multi-large-screen system including two multi-large screens.

In FIG. 4, an upper multi-large screen is configured with eight monitor devices 12 with screen IDs: 001 to 008. Moreover, a lower multi-large screen is configured with eight monitor devices 12 with screen IDs: 009 to 016.

As in the case of Embodiment 1, the monitor devices 12 are connected to image receiving/reproducing devices 11. Furthermore, each image receiving/reproducing device 11 is connected to a switching hub 14. In addition, in FIG. 4, an image generating/transmitting device 10a and an image generating/transmitting device 10b are connected to the switching hub 14. It is to be noted that, when there is no need to distinguish the image generating/transmitting device 10a and the image generating/transmitting device 10b from each other, the image generating/transmitting device 10a and the image generating/transmitting device 10b are collectively referred to as an image generating/transmitting device 10. The image generating/transmitting device 10a can make the upper multi-large screen (screen IDs: 001 to 008) and the lower multi-large screen (screen IDs: 009 to 016) display the same image. The image generating/transmitting device 10b can also make the upper multi-large screen and the lower multi-large screen display the same image. Moreover, the image generating/transmitting device 10a can make the upper multi-large screen display an image and the image generating/transmitting device 10b can make the lower multi-large screen display another image. Furthermore, the image generating/transmitting device 10b can make the upper multi-large screen display an image and the image generating/transmitting device 10a can make the lower multi-large screen display another image.

If the upper multi-large screen and the lower multi-large screen are installed in physically different locations (such as different floors in a building), the image generating/transmitting device 10 can display an arbitrary image on both multi-large screens at the same time. This means that the same image can be viewed in a plurality of distant locations at the same time. Furthermore, it is also possible to display images whose sizes are different between the multi-large screens. For instance, it is possible to display an image on the upper multi-large screen without magnification and display the image on the lower multi-large screen by reducing the image by ½.

It is to be noted that functional configuration examples and hardware configuration examples of the image generating/transmitting device 10 and the image receiving/reproducing device 11 are the same as those described in Embodiment 1. Moreover, operation examples of the image generating/transmitting device 10 and the image receiving/reproducing device 11 are also the same as those described in Embodiment 1.

Furthermore, in FIG. 4, a configuration including two multi-large screens has been described, but a configuration including three or more multi-large screens is also possible.

As described above, according to the present embodiment, it is possible to display an arbitrary image on a plurality of multi-large screens.

Moreover, since the switching hub transmits divided images by multicast, even when an image is displayed on a plurality of multi-large screens by different scaling factors, the load of the image generating/transmitting device remains the same.

Furthermore, in the present embodiment, it is possible to display an image on a plurality of multi-large-screen systems by different scaling factors in accordance with a scaling instruction from the image generating/transmitting device.

Embodiment 3

In Embodiment 1 and Embodiment 2, a configuration in which one monitor device 12 is connected to the image receiving/reproducing device 11 has been described. In contrast, a plurality of monitor devices 12 may be connected to the image receiving/reproducing device 11.

Figure 15:
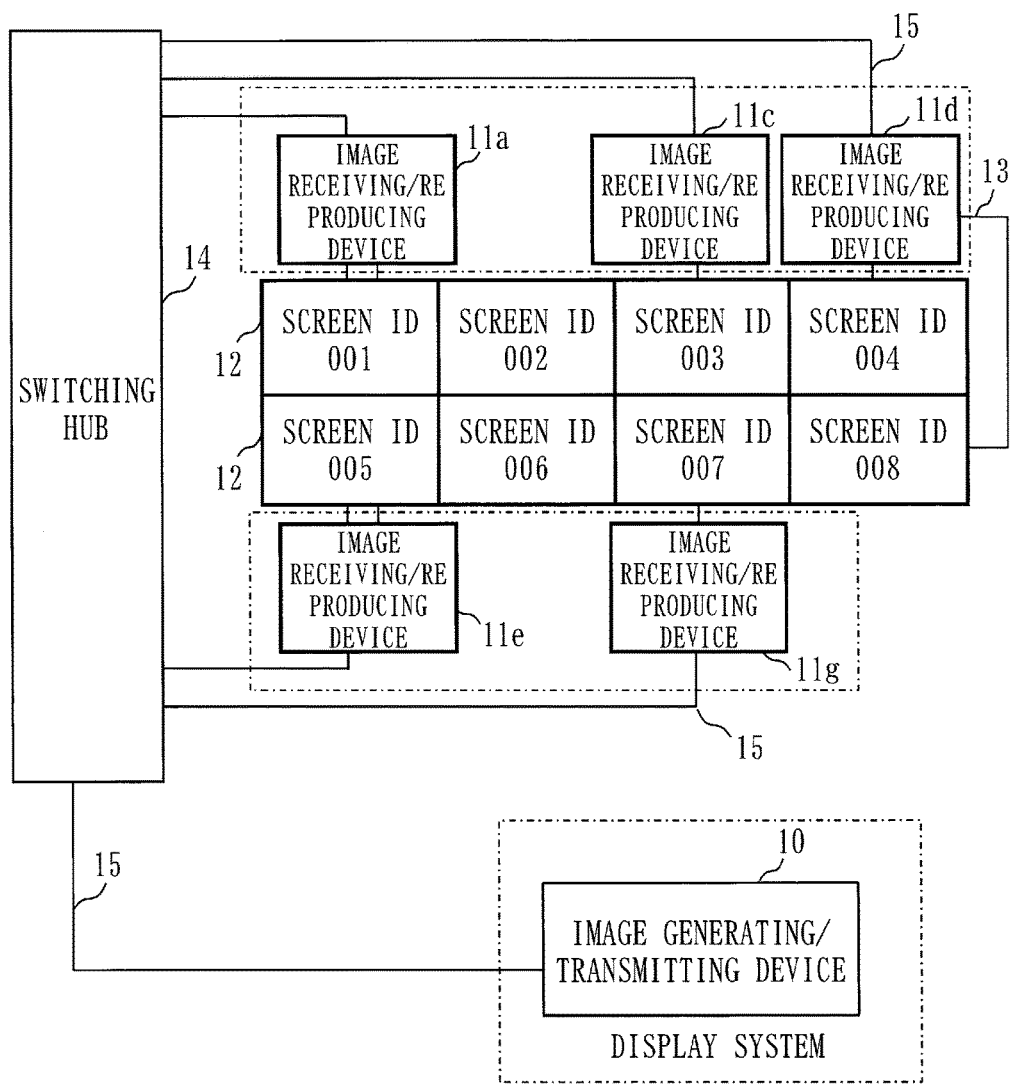
FIG. 15 is a diagram illustrating a configuration example of a multi-large-screen system according to Embodiment 3.

That is, like an image receiving/reproducing device 11a of FIG. 15, one image receiving/reproducing device 11 may be connected to two or more monitor devices 12. Moreover, like an image receiving/reproducing device 11c, an image receiving/reproducing device 11 to which one monitor device 12 is connected and, like the image receiving/reproducing device 11a, an image receiving/reproducing device 11 to which a plurality of monitor devices 12 is connected may coexist.

FIG. 16 illustrates an example of the connection information for the case of the configuration of FIG. 15.

For the image receiving/reproducing device 11a, regions of a monitor device with a screen ID: 001 and a monitor device with a screen ID: 002 are defined. Moreover, the number of screens is "2". On the other hand, for the image receiving/reproducing device 11c, only a region of a monitor device with a screen ID: 003 is defined.

If the image receiving/reproducing device 11 includes a plurality of video output terminals, it is possible to connect one image receiving/reproducing device 11 to a plurality of monitor devices 12. It is considered that this connection configuration will change with the progress of technology.

It is to be noted that functional configuration examples and hardware configuration examples of the image generating/transmitting device 10 and the image receiving/reproducing device 11 are the same as those described in Embodiment 1. Moreover, operation examples of the image generating/transmitting device 10 and the image receiving/reproducing device 11 are also the same as those described in Embodiment 1.

Furthermore, in FIG. 15, the example in which two monitor devices 12 are connected to one image receiving/reproducing device 11 has been illustrated; however, three or more monitor devices 12 may be connected to one image receiving/reproducing device 11.

Embodiment 4

In the above embodiments, a configuration in which the image receiving/reproducing device 11 can autonomously operate based on the "display image layout information" has been described; however, by transmitting the display image layout information from the image generating/transmitting device 10, a third PC, or the like as a command for switching display, an equivalent operation is possible.

While the embodiments of the present invention have been described, two or more of these embodiments may be combined and carried out.

Alternatively, one of these embodiments may be partially carried out.

Alternatively, two or more of these embodiments may be partially combined and carried out.

It is to be noted that the present invention is not limited to these embodiments and can be changed in various ways when necessary.

*Description of the Hardware Configuration*

Finally, a supplementary explanation of the hardware configuration will be given.

In the storage devices 1703 and 1803 illustrated in FIGS. 17 and 18, an OS (Operating System) is also stored.

At least part of the OS is executed by the processors 1701 and 1801.

Figure 3:
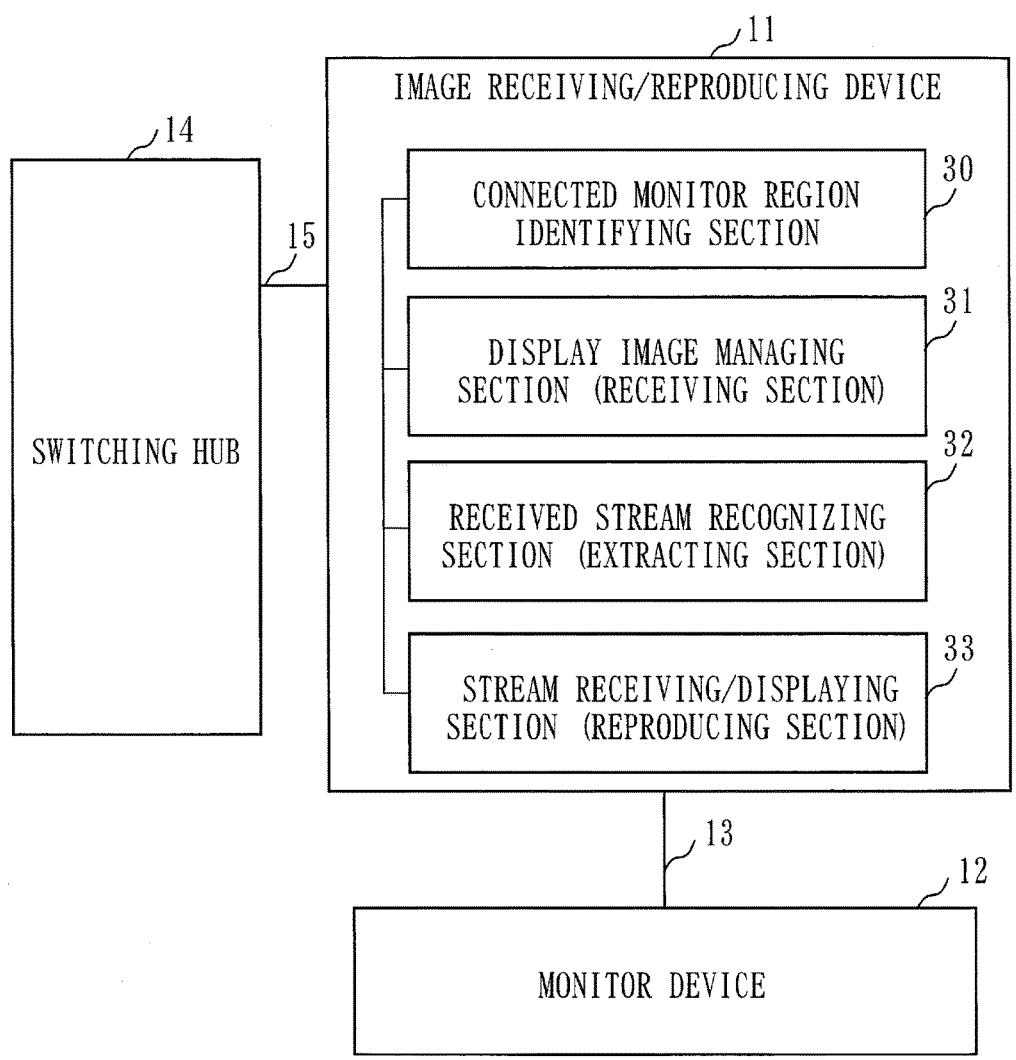
FIG. 3 is a diagram illustrating a functional configuration example of an image receiving/reproducing device according to Embodiment 1.

While executing at least part of the OS, the processors 1701 and 1801 execute the program that implements the functional component elements illustrated in FIG. 2 or the functional component elements illustrated in FIG. 3.

As a result of the processors 1701 and 1801 executing the OS, task management, memory management, file management, communication control, and so forth are performed.

Moreover, the information, data, signal value, or variable value indicating the result of processing of the functional component elements illustrated in FIG. 2 is stored in the memory 1702 or a register or cache memory in the processor 1701.

Furthermore, the information, data, signal value, or variable value indicating the result of processing of the functional component elements illustrated in FIG. 3 is stored in the memory 1802 or a register or cache memory in the processor 1801.

In addition, the program that implements the functional component elements illustrated in FIG. 2 or the program that implements the functional component elements illustrated in FIG. 3 may be stored in a portable storage medium such as a magnetic disc, a flexible disc, an optical disc, a compact disc, a Blu-ray (a registered trademark) disc, or a DVD.

Moreover, the image generating/transmitting device 10 or the image receiving/reproducing device 11 may be implemented by an electronic circuit such as a logic IC (Integrated Circuit), a GA (Gate Array), an ASIC (Application Specific Integrated Circuit), or an FPGA (Field-Programmable Gate Array).

In this case, the functional component elements illustrated in FIG. 2 or the functional component elements illustrated in FIG. 3 are implemented as part of the electronic circuit.

It is to be noted that the processors and the above-described electronic circuit are also collectively referred to as processing circuitry.

REFERENCE SIGNS LIST

10: image generating/transmitting device; 11: image receiving/reproducing device; 12: monitor device; 13: video cable; 14: switching hub; 15: network cable; 21: connection information managing section; 22: display image layout managing section; 23: multicast address/port managing section; 24: frame number assigning section; 25: image division/distribution table managing section; 26: multicast address/port allocating section; 27: image dividing/stream transmitting section; 28: setting data transmitting section; 29: transmission load distributing section; 30: connected monitor region identifying section; 31: display image managing section; 32: received stream recognizing section; 33: stream receiving/displaying section.

The invention claimed is:

1. An image receiving/reproducing device that is included in a display system which makes a display screen formed of a plurality of arranged monitor devices display an image, and that is connected to a monitor device among the plurality of monitor devices, the image receiving/reproducing device comprising:

processing circuitry to:

identify a connected monitor region which is a region on the display screen occupied by a connected monitor device which is the monitor device to which the image receiving/reproducing device is connected, by using screen coordinates which are coordinates set on the display screen;

receive divided image definition information that defines a display region of each of a plurality of divided images on the display screen by using the screen coordinates, the plurality of divided images obtained by division of the image which is to be displayed on the display screen;

extract from the plurality of divided images, a receiving target divided image which is a divided image whose display region defined by the divided image definition information overlaps at least partially with the connected monitor region and extract a reproduction target range which is a range overlapping with the connected monitor region in the receiving target divided image; and receive the receiving target divided image, reproduce the reproduction target range in the receiving target divided image, and output a reproduction result of the reproduction target range to the connected monitor device, wherein the processing circuitry receives, for each divided image, the divided image definition information that defines a multicast address which is used in acquisition of a divided image, and receives the receiving target divided image from a transmission source, by using the multicast address of the receiving target divided image which is defined by the divided image definition information.

2. The image receiving/reproducing device according to claim 1, wherein if a plurality of receiving target divided images is extracted and a reproduction target range among a plurality of reproduction target ranges extracted from the plurality of receiving target divided images is placed behind another reproduction target range and is not displayed by the connected monitor device, the processing circuitry does not reproduce the reproduction target range which is not displayed by the connected monitor device.

3. The image receiving/reproducing device according to claim 1, wherein if a plurality of receiving target divided images is extracted and a reproduction target range among a plurality of reproduction target ranges extracted from the plurality of extracted receiving target divided images is placed behind another reproduction target range and is not displayed by the connected monitor device, the processing circuitry does not receive a receiving target divided image including the reproduction target range which is not displayed by the connected monitor device.

4. An image generating/transmitting device that is included in a display system which makes a display screen formed of a plurality of arranged monitor devices display an image, that communicates with an image receiving/reproducing device which is connected to a monitor device among the plurality of monitor devices, and that is connected to a relay device which is connected to the image receiving/reproducing device, the image generating/transmitting device comprising:

processing circuitry to:

divide the image which is to be displayed on the display screen into a plurality of divided images;

generate divided image definition information that defines, by using screen coordinates which are coordinates set on the display screen, a display region of each divided image on the display screen; and transmit the divided image definition information to the image receiving/reproducing device, wherein the image receiving/reproducing device identifies, by using the screen coordinates, a connected monitor region which is a region on the display screen occupied by a connected monitor device which is the monitor device to which the image receiving/reproducing device is connected, and by transmitting the divided image definition information to the image receiving/reproducing device, the image generating/transmitting device makes the image receiving/reproducing device extract from the plurality of divided images, a receiving target divided image which is a divided image whose display region defined by the divided image definition information overlaps at least partially with the connected monitor region, makes the image receiving/reproducing device extract a reproduction target range which is a range overlapping with the connected monitor region in the receiving target divided image, makes the image receiving/reproducing device receive the receiving target divided image, makes the image receiving/reproducing device reproduce the reproduction target range in the receiving target divided image, and makes the image receiving/reproducing device output a reproduction result of the reproduction target range to the connected monitor device, and wherein the processing circuitry generates, for each divided image, the divided image definition information that defines a multicast address which is used by the image receiving/reproducing device when acquiring a divided image from the relay device, and after transmitting the divided image definition information to the image receiving/reproducing device, the processing circuitry transmits each divided image to the relay device with the divided image being associated with a corresponding multicast address.

5. A display system that makes a display screen formed of a plurality of arranged monitor devices display an image, the display system comprising:
an image receiving/reproducing device connected to a monitor device among the plurality of monitor devices; and
an image generating/transmitting device to communicate with the image receiving/reproducing device, wherein
the image generating/transmitting device
divides the image which is to be displayed on the display screen into a plurality of divided images,
generates divided image definition information that defines, by using screen coordinates which are coordinates set on the display screen, a display region of each divided image on the display screen, and
transmits the divided image definition information to the image receiving/reproducing device, and
the image receiving/reproducing device
identifies, by using the screen coordinates, a connected monitor region which is a region on the display screen occupied by a connected monitor device which is the monitor device to which the image receiving/reproducing device is connected,
receives the divided image definition information,
extracts from the plurality of divided images, a receiving target divided image which is a divided image whose display region defined by the divided image definition information overlaps at least partially with the connected monitor region and extracts a reproduction target range which is a range overlapping with the connected monitor region in the receiving target divided image, and
receives the receiving target divided image, reproduces the reproduction target range in the receiving target divided image, and outputs a reproduction result of the reproduction target range to the connected monitor device
wherein
the image generating/transmitting device
is connected to a relay device which is connected to the image receiving/reproducing device,
generates, for each divided image, the divided image definition information that defines a multicast address which is used by the image receiving/reproducing device when acquiring a divided image from the relay device, and
after transmitting the divided image definition information to the image receiving/reproducing device, transmits each divided image to the relay device with the divided image being associated with a corresponding multicast address, and
the image receiving/reproducing device requests the relay device to transmit the receiving target divided image by using the multicast address of the receiving target divided image defined by the divided image definition information, and receives the receiving target divided image from the relay device.

6. An image receiving/reproducing method by a computer that is included in a display system which makes a display screen formed of a plurality of arranged monitor devices display an image, and that is connected to a monitor device among the plurality of monitor devices, the image receiving/reproducing method comprising:
identifying a connected monitor region which is a region on the display screen occupied by a connected monitor device which is the monitor device to which the computer is connected, by using screen coordinates which are coordinates set on the display screen;
receiving divided image definition information that defines a display region of each of a plurality of divided images on the display screen by using the screen coordinates, the plurality of divided images obtained by division of the image which is to be displayed on the display screen;
extracting from the plurality of divided images, a receiving target divided image which is a divided image whose display region defined by the divided image definition information overlaps at least partially with the connected monitor region and extracting a reproduction target range which is a range overlapping with the connected monitor region in the receiving target divided image; and
receiving the receiving target divided image, reproducing the reproduction target range in the receiving target divided image, and outputting a reproduction result of the reproduction target range to the connected monitor device,
wherein
in the receiving the divided image definition information, for each divided image, the divided image definition information that defines a multicast address which is used in acquisition of a divided image is received, and
in the receiving the receiving target divided image, the receiving target divided image is received from a transmission source, by using the multicast address of the receiving target divided image which is defined by the divided image definition information.

7. An image generating/transmitting method by a computer that is included in a display system which makes a display screen formed of a plurality of arranged monitor devices display an image, that communicates with an image receiving/reproducing device which is connected to a monitor device among the plurality of monitor devices, and that is connected to a relay device which is connected to the image receiving/reproducing device, the image generating/transmitting method comprising:
dividing the image which is to be displayed on the display screen into a plurality of divided images;
generating divided image definition information that defines, by using screen coordinates which are coordinates set on the display screen, a display region of each divided image on the display screen; and
transmitting the divided image definition information to the image receiving/reproducing device
wherein
the image receiving/reproducing device identifies, by using the screen coordinates, a connected monitor region which is a region on the display screen occupied by a connected monitor device which is the monitor device to which the image receiving/reproducing device is connected, and
by transmitting the divided image definition information to the image receiving/reproducing device, the computer makes the image receiving/reproducing device extract from the plurality of divided images, a receiving target divided image which is a divided image whose display region defined by the divided image definition information overlaps at least partially with the connected monitor region, makes the image receiving/reproducing device extract a reproduction target range which is a range overlapping with the connected monitor region in the receiving target divided image, makes the image receiving/reproducing device receive the receiving target divided image, makes the image receiving/reproducing device reproduce the reproduction target range in the receiving target divided image, and makes the image receiving/reproducing device output a reproduction result of the reproduction target range to the connected monitor device, and wherein in the generating the divided image definition information, the computer generates, for each divided image, the divided image definition information that defines a multicast address which is used by the image receiving/reproducing device when acquiring a divided image from the relay device, and in the transmitting the divided image definition information, after transmitting the divided image definition information to the image receiving/reproducing device, the computer transmits each divided image to the relay device with the divided image being associated with a corresponding multicast address.

8. A non-transitory computer readable medium storing an image receiving/reproducing program that causes a computer that is included in a display system which makes a display screen formed of a plurality of arranged monitor devices display an image, and that is connected to a monitor device among the plurality of monitor devices, to execute:

a region identification process of identifying a connected monitor region which is a region on the display screen occupied by a connected monitor device which is the monitor device to which the computer is connected, by using screen coordinates which are coordinates set on the display screen;

a reception process of receiving divided image definition information that defines a display region of each of a plurality of divided images on the display screen by using the screen coordinates, the plurality of divided images obtained by division of the image which is to be displayed on the display screen;

an extraction process of extracting from the plurality of divided images, a receiving target divided image which is a divided image whose display region defined by the divided image definition information overlaps at least partially with the connected monitor region and extracting a reproduction target range which is a range overlapping with the connected monitor region in the receiving target divided image; and a reproduction process of receiving the receiving target divided image, reproducing the reproduction target range in the receiving target divided image, and outputting a reproduction result of the reproduction target range to the connected monitor device wherein in the reception process, the program causes the computer to receive, for each divided image, the divided image definition information that defines a multicast address which is used in acquisition of a divided image, and in the reproduction process, the program causes the computer to receives the receiving target divided image from a transmission source, by using the multicast address of the receiving target divided image which is defined by the divided image definition information.

9. A non-transitory computer readable medium storing an image generating/transmitting program that causes a computer that is included in a display system which makes a display screen formed of a plurality of arranged monitor devices display an image, that communicates with an image receiving/reproducing device which is connected to a monitor device among the plurality of monitor devices, and that is connected to a relay device which is connected to the image receiving/reproducing device, to execute:

an image division process of dividing the image which is to be displayed on the display screen into a plurality of divided images;

a definition information generation process of generating divided image definition information that defines, by using screen coordinates which are coordinates set on the display screen, a display region of each divided image on the display screen; and a transmission process of transmitting the divided image definition information to the image receiving/reproducing device, wherein the image receiving/reproducing device identifies, by using the screen coordinates, a connected monitor region which is a region on the display screen occupied by a connected monitor device which is the monitor device to which the image receiving/reproducing device is connected, and by transmitting the divided image definition information to the image receiving/reproducing device, the computer makes the image receiving/reproducing device extract from the plurality of divided images, a receiving target divided image which is a divided image whose display region defined by the divided image definition information overlaps at least partially with the connected monitor region, makes the image receiving/reproducing device extract a reproduction target range which is a range overlapping with the connected monitor region in the receiving target divided image, makes the image receiving/reproducing device receive the receiving target divided image, makes the image receiving/reproducing device reproduce the reproduction target range in the receiving target divided image, and makes the image receiving/reproducing device output a reproduction result of the reproduction target range to the connected monitor device, and wherein in the definition information generation process, the program causes the computer to generate, for each divided image, the divided image definition information that defines a multicast address which is used by the image receiving/reproducing device when acquiring a divided image from the relay device, and in the transmission process, after transmitting the divided image definition information to the image receiving/reproducing device, the program causes the computer to transmit each divided image to the relay device with the divided image being associated with a corresponding multicast address.

* * * * *